(12) United States Patent
del Sol

(10) Patent No.: US 12,311,523 B2
(45) Date of Patent: May 27, 2025

(54) ERGONOMIC INSTRUMENT HANDLING SYSTEM

(71) Applicant: del Sol Designs, LLC, Harrisburg, PA (US)

(72) Inventor: Tammy del Sol, Harrisburg, PA (US)

(73) Assignee: DEL SOL DESIGNS, LLC, Harrisburg, PA (US)

( * ) Notice: Subject to any disclaimer, the term of this patent is extended or adjusted under 35 U.S.C. 154(b) by 0 days.

(21) Appl. No.: 18/559,650

(22) PCT Filed: May 12, 2022

(86) PCT No.: PCT/US2022/029019
§ 371 (c)(1),
(2) Date: Nov. 8, 2023

(87) PCT Pub. No.: WO2022/241133
PCT Pub. Date: Nov. 17, 2022

(65) Prior Publication Data
US 2024/0227150 A1     Jul. 11, 2024

Related U.S. Application Data

(60) Provisional application No. 63/187,717, filed on May 12, 2021.

(51) Int. Cl.
*B25G 1/10* (2006.01)
*A61C 3/00* (2006.01)

(52) U.S. Cl.
CPC ............... *B25G 1/102* (2013.01); *A61C 3/00* (2013.01)

(58) Field of Classification Search
CPC ........ B25G 1/102; B43K 23/004; A61C 3/00; A61C 3/04
See application file for complete search history.

(56) References Cited

U.S. PATENT DOCUMENTS

| 2,503,061 A | 4/1950 | Laszlo |
| 3,055,341 A | 9/1962 | Helmuth |

(Continued)

FOREIGN PATENT DOCUMENTS

| DE | 836832 C | 4/1952 |
| DE | 4211417 A1 | 10/1993 |

(Continued)

OTHER PUBLICATIONS

AESCULAP, "Laparoscopic instruments", [retrieved on Jun. 4, 2021]. Retrieved from the Internet <URL: https://www.aesculapusa.com/en/healthcare-professionals/or-solutions/or-solutions-laparoscopic-instruments.html>.

(Continued)

*Primary Examiner* — Dean J Kramer
(74) *Attorney, Agent, or Firm* — Justin R. Muehlmeyer; Peacock Law P.C.

(57) ABSTRACT

An ergonomic handling system and methods for hand-held instruments including a rotation member capable of coordinating with the instrument and shaped, sized and oriented to enhance the precision of the user's rotation of the instrument and reduce the strain on the user's wrist and hand. The system may also include a stabilization member as a stabilizing handle. Various shapes and features of the rotation member and stabilization member are described, as well as variations on how the rotation member and stabilization member are attached to or integrated within the system, including versions for retrofitting to existing instruments or that are already integrated to serve as the shaft for the instrument to be prefabricated.

20 Claims, 14 Drawing Sheets

(56) References Cited

U.S. PATENT DOCUMENTS

| | | | |
|---|---|---|---|
| 5,143,463 A * | 9/1992 | Pozil | G09B 11/02 |
| | | | 401/6 |
| 5,478,351 A | 12/1995 | Meade et al. | |
| 5,873,148 A | 2/1999 | Arnold | |
| 6,254,293 B1 | 7/2001 | Citrenbaum | |
| 6,575,919 B1 | 6/2003 | Reiley et al. | |
| 6,705,788 B2 * | 3/2004 | Gadberry | B43K 23/004 |
| | | | 401/6 |
| 6,926,151 B1 | 8/2005 | Perry et al. | |
| 8,043,291 B2 | 10/2011 | Accordino | |
| 8,146,968 B1 | 4/2012 | Starr | |
| 8,167,899 B2 | 5/2012 | Justis et al. | |
| 8,585,725 B2 | 11/2013 | Duperior et al. | |
| 9,550,303 B2 | 1/2017 | Robertson et al. | |
| 9,655,688 B2 | 5/2017 | Ladd et al. | |
| 9,962,211 B2 | 5/2018 | Csernatoni | |
| 10,349,967 B2 | 7/2019 | Hibner et al. | |
| 10,660,478 B2 | 5/2020 | Koke | |
| 10,675,027 B2 | 6/2020 | Aldridge et al. | |
| 2006/0084032 A1 | 4/2006 | Tipton et al. | |
| 2008/0096163 A1 | 4/2008 | Buchanan | |
| 2008/0205967 A1 | 8/2008 | Purvine | |
| 2020/0376647 A1 | 12/2020 | Rolland | |

FOREIGN PATENT DOCUMENTS

| | | | |
|---|---|---|---|
| DE | 10006788 A1 | | 8/2001 |
| DE | 102009032123 A1 | | 9/2010 |
| DE | 202020102451 U1 * | | 7/2020 |
| GB | 673602 A | | 6/1952 |
| GB | 2411348 A | | 8/2005 |
| KR | 101007577 B1 | | 1/2011 |
| NZ | 574949 A | | 4/2011 |
| WO | 2006027224 A1 | | 3/2006 |

OTHER PUBLICATIONS

Becton, Dickinson and Company, "Ergonomic ring-handle instruments: modular", [retrieved on Jun. 4, 2021]. Retrieved from the Internet <URL: https://www.bd.com/en-ca/offerings/capabilities/surgical-instruments/laparoscopic-instruments/snowden-pencer-ergonomic-laparoscopic-instruments/ergonomic-ring-handle-instruments-modular>.

* cited by examiner

ERGONOMIC INSTRUMENT HANDLING SYSTEM

CROSS-REFERENCE TO RELATED APPLICATIONS

This application claims priority to and the benefit of the filing of U.S. Provisional Patent Application No. 63/187,717, entitled "Ergonomic Instrument Handling System", filed on May 12, 2021, and the specification thereof is incorporated herein by reference.

BACKGROUND OF THE INVENTION

Field of the Invention

Embodiments of the present invention relate to ergonomic handling systems for hand-held instruments.

Background Art

Hand-held instruments used for operations and procedures requiring a certain degree of precision, and particularly those instruments held with a pencil grip (vs. a knife grip), often result over time, in causing discomfort, pain, weakness and disability in the joints of the hand as well as the fingers and thumb. For example, in dentistry, the scaler is an instrument normally used by dental hygienists in their dominant hand, to remove plaque, tartar and stain from the surfaces of the teeth of patients. A dental scaler has a single elongated handle similar to that of a pencil, which the user holds as one would a pencil or pen. In a typical hygiene appointment, the hygienist will hold the scaler, and other such similar scaling instruments utilizing a strong pinch grip, as they pull and scrape the plaque, tartar and stain off the root surfaces of their patient's teeth. In these procedures, the hygienist not only exerts a force laterally along the handle of the instrument, as they pull the debris away from tooth surfaces, they also rotate their wrist to follow the circumference and debris that is attached to the periphery of those root surfaces. It is the combination of those exertions and forces that combine to cause debilitating discomfort and weakness in the user's hands.

Moreover, the use of the dental mirror, normally always used in the dental practitioner's non-dominant hand, can also have a debilitating impact on the practitioner's hand over time. Like a dental scaler, a dental mirror has a single elongated handle whereby the user incorporates a pencil grip. The dental mirror is not only used for examining the patient's mouth and oral cavity, but also to retract or push the tongue and cheeks out of the way in order to perform various dental procedures. It is the strong pinch grip needed on the mirror, as the user either pulls a strong tongue to the side, for example, or the opposite—using that same grip to push the tongue out of the way. In addition, the mirror, when rotated during these procedures, involves rotating the wrist, similarly as when using a dental scaler. Both of these dental instruments, and indeed all instruments with single elongated handles are culpable in the development of many carpal tunnel, trigger finger/thumb and other musculoskeletal disorders (MSD) whenever the pinch grip/pencil grip are utilized.

The use of hand-held instruments currently available and utilized for precise operations and procedures very often may lead to pain and discomfort for the user in their fingers, wrists, ligaments, joints and thumbs. This often leads to diagnoses of carpal tunnel syndrome, trigger thumb and other similar ailments, which in turn often times leads to surgery and long periods of rehab and physical therapy prior to the user returning to that occupation. In severe situations, the user may be forced to find another occupation altogether, in order to avoid the continuation of that level of wrist/hand/joint pain.

Sometimes, in order to avoid the discomfort of the use of the hand-held instruments needed to perform the procedures of operations, the user compensates in other ways. For example, they may rotate their shoulder, move their wrist excessively, and/or crane their neck. Of course, all of these bodily compensations also may lead to physical deterioration.

In dentistry, dental hygienists use scalers and curettes to clean their patients' teeth. These metal instruments, usually double-ended, have various sharpened edges which serve the purpose of scraping the coronal and root surfaces of the tooth in order to remove plaque, stain and tartar. The pinch grip, similar to the grip used when holding a pencil or pen, is the long-held accepted grip taught in hygiene and dental schools—and it is this grip, the pinching of the pointer finger, the middle finger and thumb around the narrow shaft of the instrument, which often causes so many problems. As the hygienist moves their scaler or curette around each successive tooth, using their wrist and shoulder to rotate around the patient's arch, all the while squeezing the instrument with the pinch grip as she/he pulls the tartar/stain/plaque from the surfaces of the tooth—they very often over time, will begin experiencing discomfort and pain as a result of this repetitive motion. The dentist, usually leaving the hygiene procedures to hygienists, also uses the pinch grip when using their mirror, explorer, handpiece (dental drill), or any other hand-held long shafted instrument. Like hygienists, they also may suffer over time, with carpal tunnel issues or trigger thumb.

These problems of traditional hand-held instruments are in part due to the fact that such instruments require the user's hand to deviate from neutral risk postures, which causes strain and risk of injury. Deviation from neutral wrist postures reduces the maximum strength achievable by users, especially in flexion. Traditional hand-held instruments tend to have a uniform cylindrical shape lacking any vertically oriented projections or features significant enough to allow the user to employ a pulling or latch pull action against the instrument and lack features that widen the user's grip enough to reduce strain on the wrist. Many traditional handling systems are not ergonomic at all. For example, removeable rubber pencil grips typically slide onto a pencil and aid in gripping the pencil. However, they do not provide adequate surfaces against which the user can pull, do not widen the user's grip significantly and do not provide the ability to stabilize the instrument independent of the ability to rotate it.

This problem is not unique to the field of dentistry, but is a problem in all endeavors requiring a hand-held precision instrument, including in medicine for surgical operations, in the visual arts for activities like painting or drawing, and even basic activities such as writing (pens and pencils) and eating (food utensils). All those in occupations including dentistry, medicine, the culinary arts, drafting, architecture, painting, writing (by hand), etc., and anyone who utilizes a hand-held instrument with a long shaft and does repetitive motions over a length of time, is vulnerable to carpal tunnel and trigger thumb issues.

What is needed is a system that can be easily attached to hand-held instruments to maintain the user's grip on the instrument while allowing the instrument to rotate independent of the user's grip. What is needed is a system of handling hand-held instruments that reduces the deviation in the user's hand from its most natural, relaxed or ergonomic position and reduces strain on the user's wrist. What is needed is a new system focused on addressing the design of instruments and tools that are hand-held with long shafts. What is needed is a system that can be added to an instrument or that modifies an instrument which allows the user to hold the instrument without having to pinch the instrument as the primary way of supporting and using it, and furthermore allows the user to rotate the instrument with the strength of the fingers rather than employing a "pinch grip", as well as providing a stabilizing grip that, while attached to the shaft of the instrument, is not fixed. What is needed is a modification to the instrument, whereby the user may utilize latch forces instead of utilizing pinch grip forces in order to retract (tartar, stain, tongues, cheeks—for example) or push (tongues and cheeks).

BRIEF SUMMARY OF EMBODIMENTS OF THE PRESENT INVENTION

Embodiments of the present invention are directed to an ergonomic instrument handling system capable of being attached or retrofitted to hand-held instruments that allows the user to support and stabilize the hand-held instrument while giving the user the ability to rotate the instrument independent of the user's stabilization, reducing the need for the wrist to carry the primary burden and instead placing more burden on the strength and precision of the fingers. Embodiments of the present invention reduce the need for the user to employ a pinch grip on the hand-held instrument as the sole or primary means for controlling the instrument by providing the ability of the user to employ a pulling or latch pull force that requires much less force to accomplish the same action. Embodiments of the present invention widen the area over which the user's hand applies force to the hand-held instrument and provide more surfaces to apply force to, thereby increasing the leverage the user has in applying force to or with the instrument and increasing the precision of the user's actions. Embodiments of the present invention orient the hand-held instrument higher up on the user's hand than traditional systems, thereby increasing its visibility to the user.

A system for handling a hand-held instrument preferably includes a first rotation member capable of coordinating with a hand-held instrument and capable of at least partially surrounding the shaft of the hand-held instrument, the first rotation member including a width less than the breadth of a human user's hand, a longitudinal axis oriented in the direction of the length of the first rotation member, an outer surface, and a plurality of projections each of which extend a distance in a direction that is normal to the longitudinal axis of the first rotation member, the plurality of projections defining at least two digit contact surfaces on the outer surface of the first rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, which application of force permits the user to grip the first rotation member, rotate the first rotation member about its longitudinal axis, and pull against the rotation member in a direction along its longitudinal axis, and thereby control the hand-held instrument the rotation member may be coordinated with.

Variations of the above are described herein, including the following preferred features. The first rotation member preferably includes at least five projections, and the at least two digit contact surfaces preferably include at least five contact surfaces. The at least two digit contact surfaces of the first rotation member preferably extend along the entire length of the first rotation member. The first rotation member is in some embodiments integrally formed with the hand-held instrument. The first rotation member preferably includes an inner surface capable of contacting and at least partially surrounding the shaft of the hand-held instrument, the inner surface comprising a material selected from the group consisting of: rubber, silicone, elastomer, foam, polymer, plastic and combinations thereof. The first rotation member preferably includes an inner surface capable of contacting and at least partially surrounding the shaft of the hand-held instrument, the inner surface defining a cylindrical cavity within the first rotation member the diameter of which is no greater than about the greatest diameter of the shaft of the hand-held instrument. In some embodiments, the first rotation member does not entirely surround the shaft of the hand-held instrument, the rotation member comprising a space through which the shaft of the hand-held instrument may be inserted to secure the first rotation member to the hand-held instrument. The first rotation member may comprise a hinge, zip-tie and/or screw.

The rotation member is preferably provided with or used with a stabilization member. The stabilization member preferably includes an elongated shape capable of being held by or in the hand of the user, the top end including an instrument coordination member capable of attaching the stabilization member to the shaft of the hand-held instrument. The instrument coordination member preferably includes a shape that at least partially surrounds but does not entirely surround the shaft of the hand-held instrument. The instrument coordination member preferably includes one of the mechanical devices selected from the group consisting of: a clip, a clamp, a hinge, a strap, a spring, and a ball joint. The instrument coordination member preferably includes a cavity or hole of a diameter that is no greater than about the greatest diameter of the hand-held instrument. The stabilization member also preferably includes a magnet disposed on, at or near its bottom end.

In another embodiment, the rotation member preferably includes a first shaft member integrally formed with the first rotation member, the shaft member extending a distance away from the first rotation member along the longitudinal axis of the first rotation member, the first shaft member comprising a first end and a second end, the first end comprising a first working end coordinating member capable of securing to an instrument working end. The rotation member preferably includes a second rotation member including all of the features recited of the first rotation member, and further that the first shaft member extends between and is integrally formed with the first rotation member and the second rotation member, the second end of the first shaft member including a second working end coordinating member capable of securing to an instrument working end. In another embodiment, the first rotation member is closer to the first end of the first shaft member than the second rotation member, and the second rotation member is closer to the second end of the first shaft member than the first rotation member, and each of the plurality of projections of the first and second rotation members include a projection axis extending from the center of the first shaft member radially outward through the most distant outer surface of each projection, the projection axis of at least one of the plurality of projections on the first rotation member being oriented transverse or at an angle to the projection axis of at least one of the plurality of projections on the second rotation member. In another embodiment, there are a third rotation member and a fourth rotation member each of which includes all of the features recited of the first rotation member, and in which a second shaft member extends between and is integrally formed with the third and fourth rotation members, and the first end of the second shaft member comprises first working end coordinating member capable of securing to an instrument working end and the second end of the second shaft member including a second working end coordinating member capable of securing to an instrument working end. Preferably the first and fourth rotation members are larger in size than the second and third rotation members, and the first rotation member is disposed on the first shaft member closer to the first end of the first shaft member than the second rotation member, the second rotation member is disposed on the first shaft member closer to the second end of the first shaft member than the first rotation member, the third rotation member is disposed on the second shaft member closer to the first end of the second shaft member than the fourth rotation member, and the fourth rotation member is disposed on the second shaft member closer to the second end of the second shaft member than the third rotation member. The stabilization member preferably includes an elongated shape capable of being held by or in the hand of the user, the top end comprising an instrument coordination member capable of attaching the stabilization member to the shaft member between the third and fourth rotation members. The instrument coordination member preferably includes a shape that at least partially surrounds but does not entirely surround the shaft of the hand-held instrument, to receive and coordinate the shaft of the hand-held instrument. The stabilization member also preferably includes a magnet disposed on, at or near its bottom end, so that it may stand vertically oriented on a tray for easy access by the user. In its use for dental applications, the first instrument working end of the first shaft member preferably includes a scaler, the second instrument working end of the first shaft member including a screw or threaded hole, the first working end of the second shaft member including a screw or threaded hole, and the second working end of the second shaft member including a mirror.

Embodiments of the present invention are also directed to methods of making and using the systems described herein. In one embodiment, a method of handling a hand-held instrument using a system for handling hand-held instruments includes the steps of: attaching a first rotation member to the shaft of a hand-held instrument, the first rotation member at least partially surrounding the shaft of the hand-held instrument, the first rotation member including a width less than the breadth of a human user's hand, a longitudinal axis oriented in the direction of the length of the first rotation member, an outer surface, and a plurality of projections each of which extend a distance in a direction that is normal to the longitudinal axis of the first rotation member, the plurality of projections defining at least two digit contact surfaces on the outer surface of the first rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces; attaching a stabilization member to the shaft of a hand-held instrument, the stabilization member having a bottom end and a top end and a longitudinal axis oriented in the direction of the length between the bottom and top end, the stabilization member comprising an elongated shape capable of being held by or in the hand of the user, the top end including an instrument coordination member capable of attaching the stabilization member to the shaft of the hand-held instrument, the instrument coordination member including a shape that at least partially surrounds but does not entirely surround the shaft of the hand-held instrument, the stabilization member also including a magnet at or near its bottom end; applying a force with a first digit of a user's hand to the first digit contact surface and applying a force with a second digit of the user's hand to the second digit contact surface, to grip the first rotation member, rotate the first rotation member about its longitudinal axis, and pull against the rotation member in a direction along its longitudinal axis, and thereby control the hand-held instrument the rotation member may be coordinated with; and placing the stabilization member on a tray comprising a metal by contacting the magnet on the tray, such that the longitudinal axis of the stabilization member is normal to the plane of the tray.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. While some of the drawings indicate certain dimensions, embodiments of the present invention can be of varying dimensions depending on the intended use. In the drawings.

DETAILED DESCRIPTION OF THE INVENTION

Figure 1:
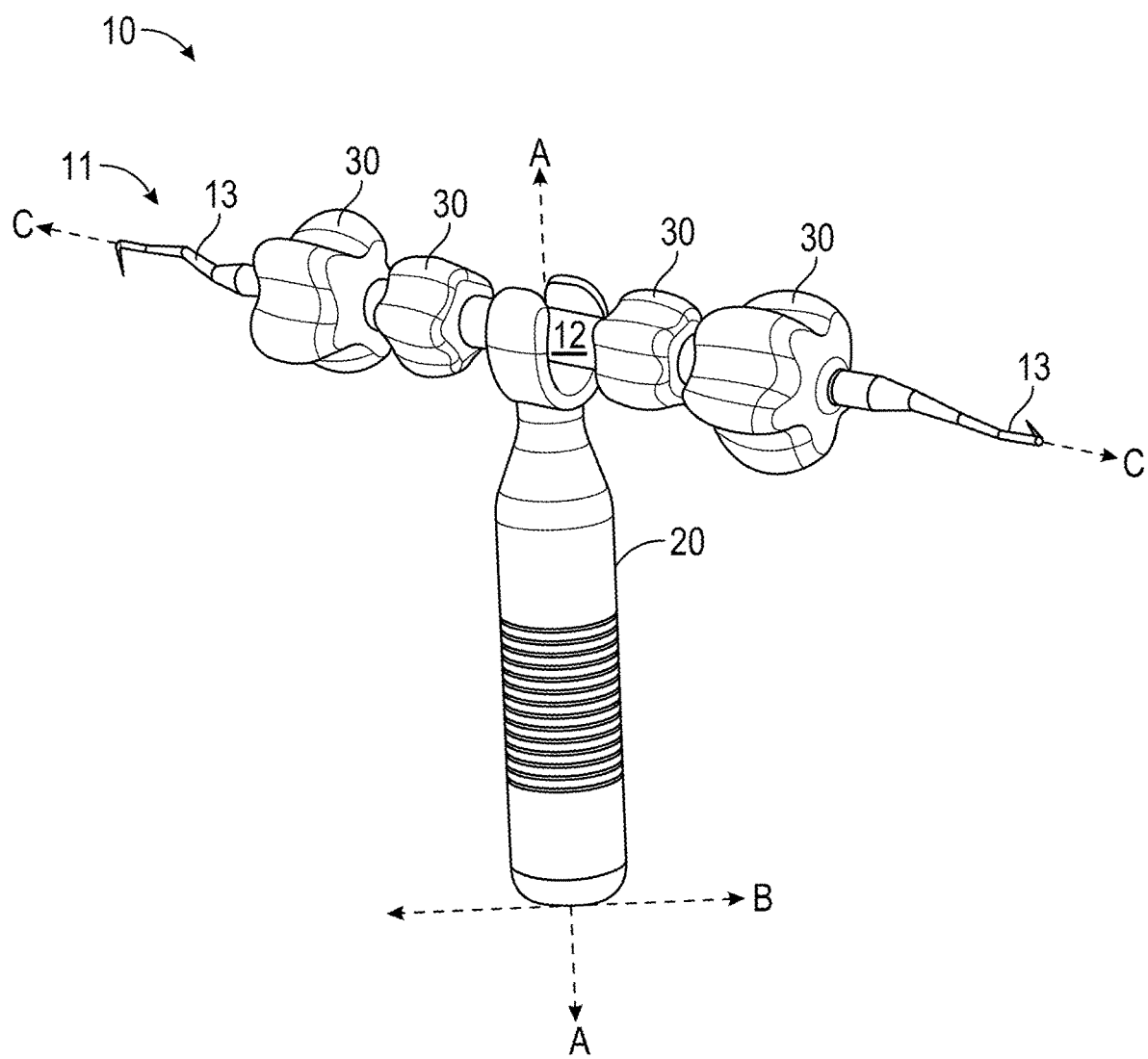
FIG. 1 is an illustration from a perspective view of an ergonomic instrument handling system including a stabilization member and four rotation members, some of which are integrally formed as part of the shaft of a dental instrument, according to an embodiment of the present invention.

Embodiments of the present invention are directed to an ergonomic instrument handling system 10 for use with instrument 11. As used herein, the term "hand-held instrument" means any instrument capable of being held by or at least partially within a single hand of any human. Instrument 11 can be any hand-held instrument, including but not limited to dental scalers, dental mirrors, scalpels, surgical tools, knives, eating utensils, paintbrushes, pens, pencils, toothbrushes, hairbrushes, rolling hairbrushes, shaving razor blades, door handles, doorknobs, container lids, jar lids, etc. Instrument 11 may be referred to herein as having a handle or shaft member 12, which refers to that part of instrument 11 that is ordinarily held by the user when in normal operation, which part is typically at least partially cylindrically shaped and elongated to connect one end to the other while giving enough space for the user's hand to hold it. Instrument 11 may also have working end 13, which is that part of instrument 11 comprising a particular tool (for example a scaler or mirror) or at least that end of instrument 11 capable of attaching to or receiving such a tool or extensions thereof. As will be described in more detail herein, system 10 is preferably retrofit to instrument 11 so that system 10 is an accessory to instrument 11 and capable of use between various instruments 11. In some embodiments however, certain components of system 10, including rotation member 30, are formed integrally together to form the shaft of instrument 11 to which working ends 13 can be attached.

For purposes of aiding in describing the various embodiments of the present invention, the following terms may be used and have the following meanings. The term "finger" means any digit of a human hand including the thumb, unless otherwise specified. The terms "grip" and "hold" are used interchangeably throughout the specification and have the same meaning unless otherwise specified. The term "breadth" when used to refer to a user's hand means the distance across the widest area where the digits join the palm.

For purposes of describing orientation herein, the terms "primary" or "longitudinal" axis are used interchangeably to mean the axis along or in the same direction as the greatest length of the object. For example, if the object is a dental scaler, it would be the axis extending along or in the same direction as the length of its handle from one end to the other opposite end, as shown in FIG. 1 as axis C. The term "vertical" shall refer to that axis of orientation normal to the plane on which an object would rest as intended. Referring to FIG. 1, the vertical axis would be the axis along axis A because stabilization member 20 is intended to rest in an upright position such that its magnet at its bottom is in contact with the plane of the tray on which it rests. The "horizontal" axis, shown in FIG. 1 as axis B, would be coplanar or oriented in the same direction as the plane of the tray, normal to the vertical axis. As shown in FIG. 1, the longitudinal axis C of instrument 11 and the rotation member 30 may or may not be parallel to horizontal axis B, depending on how it happens to rest as supported by stabilization member 20. Other orientations and surfaces may be defined in what follows.

The Relationship Between Stabilization Member 20 and Rotation Member 30.

Figure 16:
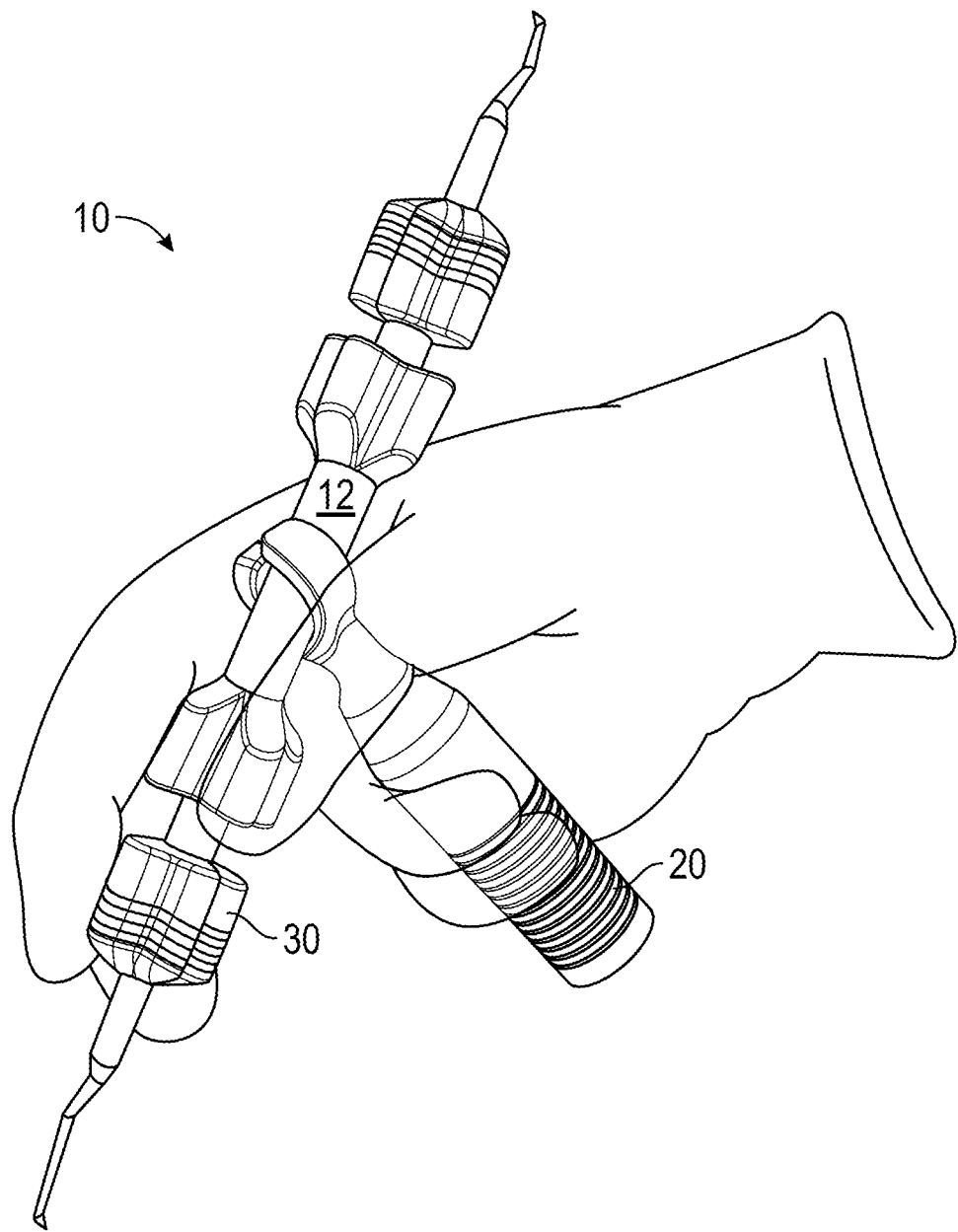
FIG. 16 is an illustration from a perspective view of an ergonomic instrument handling system as used by the hand of a user, according to an embodiment of the present invention.
Figure 17:
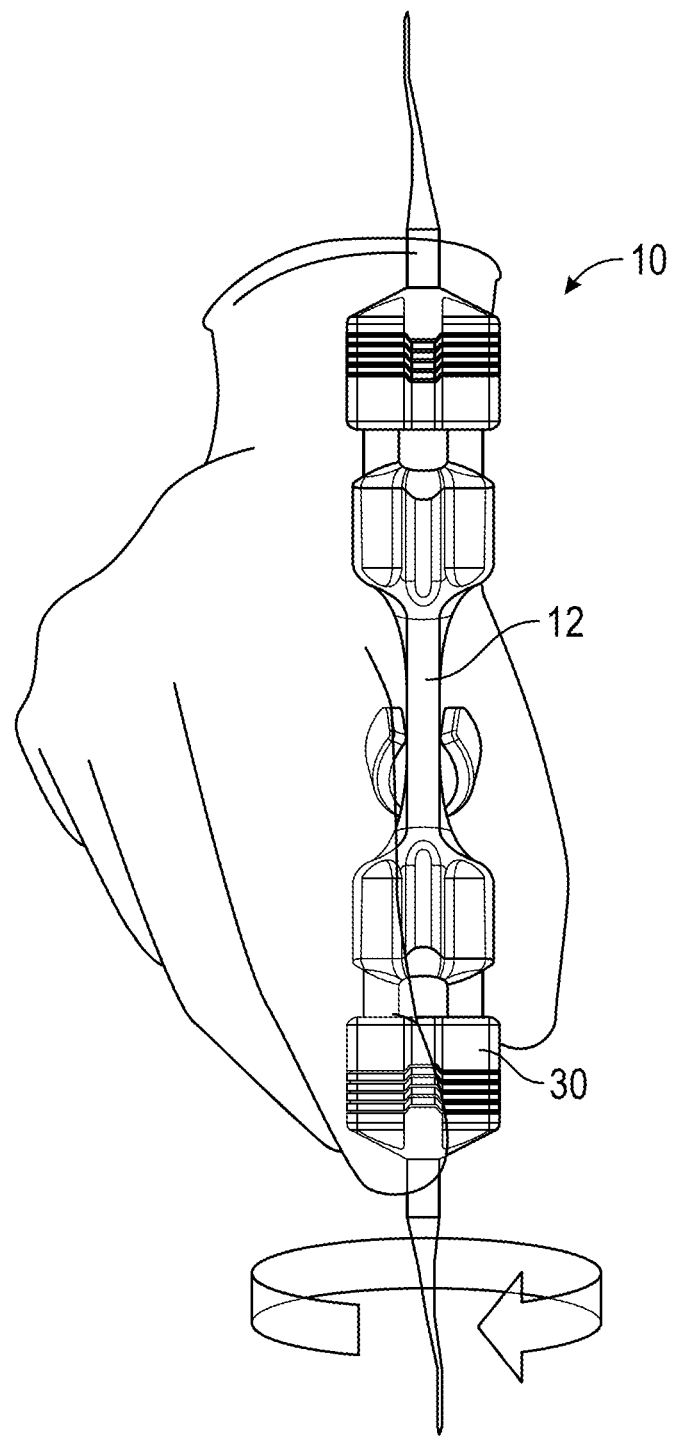
FIG. 17 is an illustration from a top view of an ergonomic instrument handling system as used by the hand of a user in a different position than that illustrated in FIG. 16, according to an embodiment of the present invention.
Figure 18:
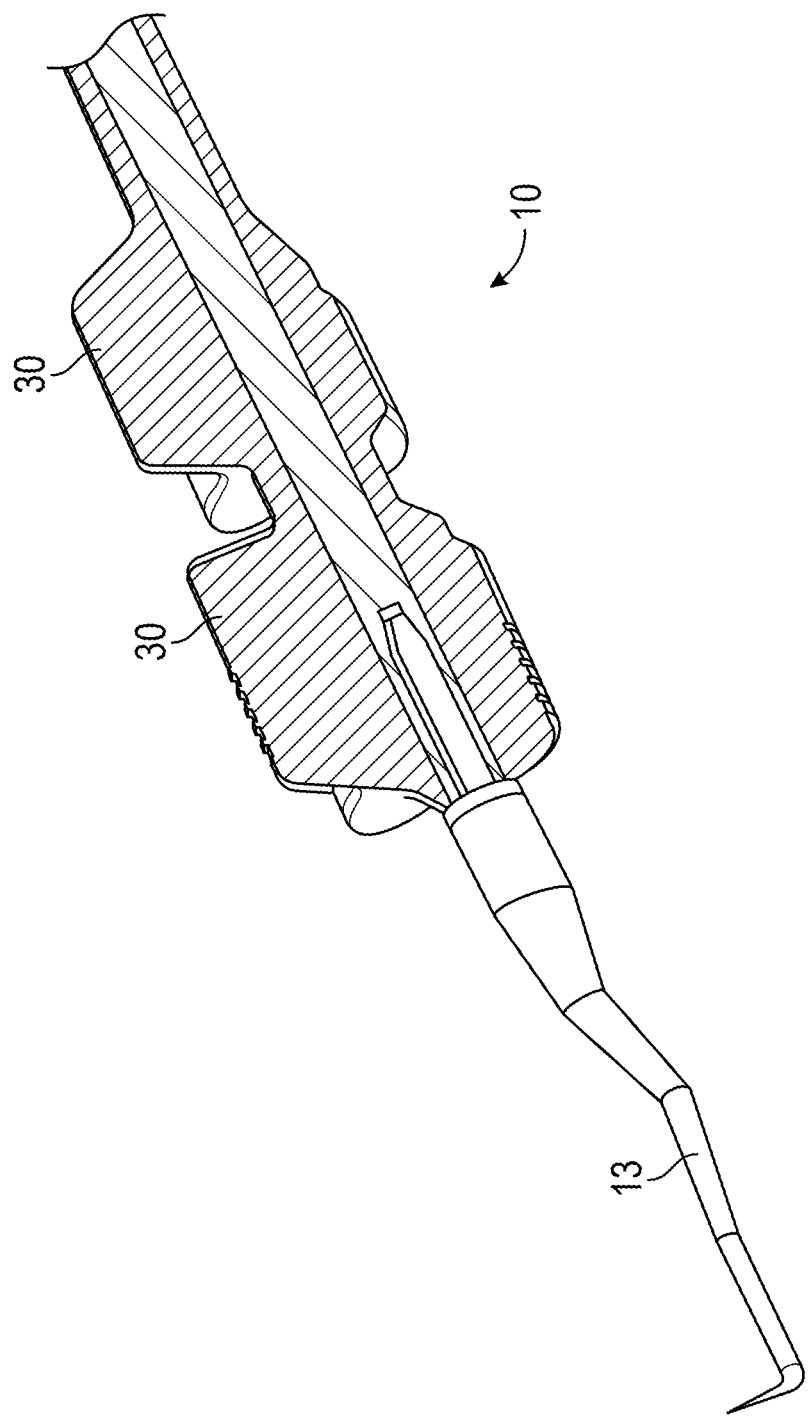
FIG. 18 is an illustration from a perspective and cross-sectional view of an ergonomic instrument handling system according to an embodiment of the present invention.

Referring to the figures, system 10 preferably comprises stabilization member 20 and at least one rotation member 30. Preferably, stabilization member 20 and rotation member 30 are separate objects independent of the other and not a single unitary object, for example as shown in FIG. 1 illustrating an embodiment in which four rotation members 30 are disposed on instrument 11 and stabilization member 20 is removably attached to the shaft of instrument 11. Stabilization member 20 is preferably removably attachable to instrument 11 to provide a structure for the user's hand to hold and to support instrument 11. Stabilization member 20 preferably permits instrument 11 to rotate within or relative to stabilization member 20. For this reason, stabilization member 20 is preferably not fixed to instrument 11. Various ways of doing so are described herein. To that end, stabilization member 20 preferably comprises instrument attachment device 40 that at least partially receives, surrounds, attaches to or otherwise is disposed on instrument 11. In this way, the user can grip stabilization member 20 with some or all of his or her fingers to support instrument 11 in the desired placement while also using some of his or her fingers to apply a force to rotation member 30 to rotate instrument 11 as needed to direct the working end of instrument 11 in the desired orientation, as perhaps best illustrated in FIGS. 16 and 17 showing various embodiments of system 10 in use by a user's hand. With this design, stabilization member 20 is the primary and most comfortable means for the user to control the pitch and yaw of instrument 11, allowing the user to stabilize instrument 11 in the most natural position of the user's wrist. Rotation member 30 provides a structure against which the user can apply force using the user's fingers rather than the user's wrist, thereby relieving the wrist of strain and employing the more natural and preferred strength in the fingers to apply force. In these ways, system 10 can be described as ergonomic.

Some embodiments of system 10 do not comprise stabilization member 20. Rotation member 30 is in some embodiments disposed on instrument 11 without stabilization member 20, in the various ways described herein.

In another embodiment, stabilization member 20 and rotation member 30 are a single unitary object such that stabilization member 20 and rotation member 30 are different components or parts of the same object. In such an embodiment, rotation member 30 is preferably fixed or securable to instrument 11 such that any force applied to it rotates instrument 11, and stabilization member 20 preferably permits instrument 11 to rotate within or relative to stabilization member 20.

Stabilization Member 20.

Figure 2:
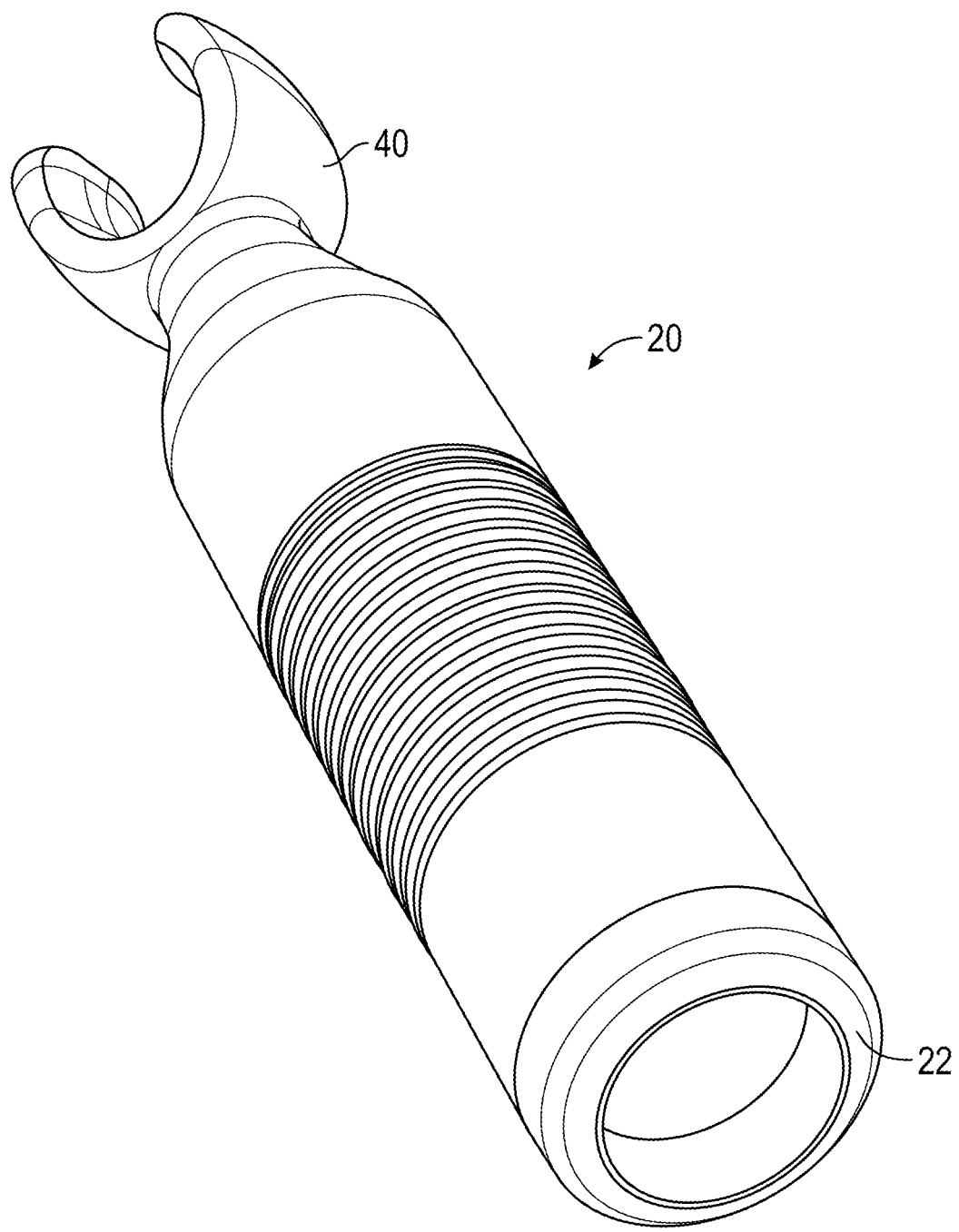
FIG. 2 is an illustration from a perspective view of a stabilization member according to an embodiment of the present invention.

Referring to FIG. 2, stabilization member 20 preferably comprises a rigid structure shaped and sized to serve as a handle for the user's hand rather than the user gripping the handle of instrument 11 itself as is traditionally done. Traditionally, when a user holds instrument 11, they hold it like a pencil, which typically requires a rotation of the wrist so that a majority of the length of at least one of the fingers can be placed above the instrument, to control it in operation. Stabilization member 20 serves as a support for instrument 11 and allows the user to support and direct instrument 11 to the desired placement without a deviation in the wrist of the user as is required in traditional methods. Preferably, the primary axis of stabilization member 20 is disposed on instrument 11 such that it is perpendicular to or at least at an angle to or transverse to the primary axis of instrument 11. In this way, the user's wrist, when gripping stabilization member 20, can be in a rested position rather than the strained position that occurs when holding instrument 11 without stabilization member 20.

The shape, size and orientation of stabilization members 20 is a personal choice of the user, depending on the ergonomic needs of that particular user. The shape of stabilization member 20 may vary depending on the application, for example, if the user is left or right handed, etc. In one embodiment, stabilization member 20 comprises an elongated cylindrical shape that is not preferential to either left or right hand use, as illustrated in FIG. 2. In another embodiment, stabilization member 20 comprises an elongated rounded shape. In another embodiment, stabilization member 20 comprises a shape similar to that of the grip or handle of a hand gun, with contours that coordinate to be in contact with the contours of the fingers or palm of the user's hand. In another embodiment, stabilization member 20 comprises a quadrilateral shape and/or comprises straight edges. In another embodiment, stabilization member 20 comprises contours, projections, ridges, valleys and/or indentations disposed to provide additional support or sensory feedback for the user's fingers or to match the contours of a human palm and to reduce slippage of the hand. In another embodiment, stabilization member 20 comprises a plurality of curved or loop shapes, comprising top and bottom loops oriented in the same direction similar to the shape of a seahorse. In some embodiments, stabilization member 20 comprises a bottom finger grip comprising a curve or loop shape at or near the bottom end of stabilization member 20, shaped to at least partially encircle at least the pinky finger of the user's hand. The bottom finger grip is preferably shaped to at least partially encircle both the pinky and ring fingers of the user's hand. The bottom finger grip is preferably shaped to at least partially encircle all of the pinky, ring and middle fingers of the user's hand. The diameter of such shape is preferably about at least the diameter of a user's finger or the aggregate of the diameters of the fingers intended to be inserted into the bottom finger grip. In another embodiment, the bottom finger grip completely encircles itself as a closed loop so that the user inserts his or her finger and finds itself completely encircled. In another embodiment, the bottom finger grip is not a closed loop. Preferably, the bottom finger grip is unitary with stabilization member 20, that is, forming the same single object. In another embodiment, the bottom finger grip is independent and separable from stabilization member 20 such that it can be removably attachable to stabilization member 20 in case the user does not want to use stabilization member 20 with the bottom finger grip.

Stabilization member 20 is preferably formed of a rigid material capable of maintaining its structural integrity under force of a human hand, including but not limited to elastomer, rubber, plastic/polymer, foam, etc., and any combination thereof. In one embodiment, rubber or elastomer is layered on stabilization member 20 only where the user's fingers are intended to contact it, to provide grip and a visual reference for holding stabilization member 20 in its most ergonomic position.

In some embodiments, stabilization member 20 is colored with a paint so that it can be distinguished from other tools, instruments or stabilization members 20. For example, a first stabilization member 20 comprises a first color to represent its use with an interior scaler instrument and a second stabilization member 20 comprises a second color to represent its use with a posterior scaler instrument.

The dimensions of stabilization member 20 depend on the particular application. For most applications, including dental or medical applications, stabilization member 20 preferably comprises a length that is at least the width of the palm of the smallest adult human hands or at least the distance of the sum of the width of the index, middle, ring and pinky fingers, so that the user has the option of wrapping all of their wrapping fingers around stabilization member 20. However, various embodiments have various dimensions depending on the application. For example, in some embodiments, it is intended that only one or two of the user's fingers grip stabilization member 20. In other embodiments, the length of stabilization member 20 is intended to far exceed the size of the user's hand and to extend down to the ground from the user's height of operation so that system 10 can be supported on the ground. Preferably, the length of stabilization member 20 is about two centimeters to about two meters, more preferably about four centimeters to about twenty centimeters, and most preferably about five centimeters to about ten centimeters. The diameter of stabilization member 20 is less forgiving on the range because stabilization member 20 is intended to be held by the user's hand, ideally such that the user can wrap at least one of their fingers entirely around it. Preferably, the diameter (or depth) of stabilization member 20 is about ½ centimeter to about ten centimeters, more preferably about two centimeters to about eight centimeters, and most preferably about three centimeters to about six centimeters. The diameter or depth of stabilization member 20 may vary along its length due to contours, projections, ridges, valleys and/or indentations in its shape. In such cases where the shape or diameter of the stabilization varies along its length, the ranges above may refer to that horizontal cross section of the stabilization member having the greatest diameter.

It is contemplated that users will want to use the very same stabilization member 20 across numerous instruments 11. One of the objectives of system 10 is to enable users to use the same stabilization member 20 across any number of instruments 11 by simply attaching and detaching the stabilization member 20 to and from instrument 11 as desired. It is also contemplated that it is time consuming to secure any device to instrument 11 directly and permanently itself, because such must be tightened accordingly and located precisely. To that end, stabilization member 20 is preferably removably attachable to instrument 11.

Figure 3:
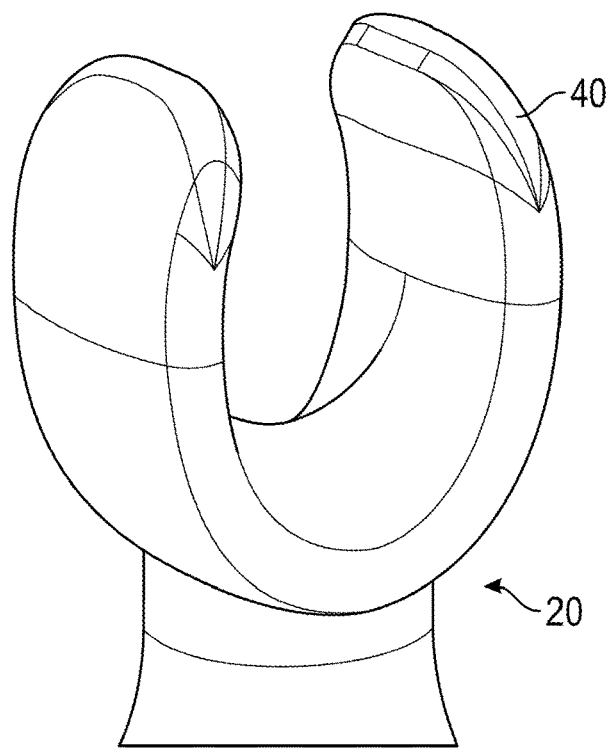
FIG. 3 is an illustration from a perspective view of the top of a stabilization member, showing an instrument attachment device, according to an embodiment of the present invention.

Stabilization member 20 preferably comprises instrument attachment device 40 at or near the top of stabilization member 20 capable of removably securing stabilization member 20 to instrument 11 while allowing instrument 11 to rotate relative to stabilization member 20. Preferably, instrument attachment device 40 comprises a shape, feature or mechanism capable of applying force to, being tightened to, loosened around or otherwise capable of coordinating with instrument 11, including but not limited to a shaped feature, clip, clamp, hinge, strap, tie, spring, ball and joint socket, ring, swivel, etc. In one embodiment, perhaps best illustrated in FIG. 3, stabilization member 20 comprises a shape with a width that is capable of at least partially encircling the shaft of instrument 11 or shaft member 12. In another embodiment, instrument attachment device 40 comprises friction receptacle comprising a cavity or hole extending through stabilization member 20 of a diameter that is no greater than about the greatest diameter of instrument 11 or shaft member 12 such that when instrument 11 is received into it, instrument 11 slides through it until friction secures stabilization member 20 to it, so that instrument 11 can be received in the friction receptacle and slid into the desired position of stabilization member 20 relative to rotation member 30. In some embodiments, instrument attachment device 40 comprises additional material along its surfaces that would be in contact with instrument 11, which material may serve as a padding to aid in adding friction and accommodating a wider range of diameter instruments 11.

In another embodiment, instrument 11 or shaft member 12 comprises a ball that inserts, snaps or otherwise coordinates with a receptacle of instrument attachment device 40 which comprises a concave shape with a diameter that is at least as large as the diameter of the ball and that at least partially surrounds the ball, thereby allowing instrument 11 to rotate or swivel in relation to stabilization member 20. In another embodiment, instrument 11 or shaft member 12 comprise a pin or other projection that inserts, snaps or otherwise coordinates with a receptacle of instrument attachment device 40. In another embodiment, a receptacle of instrument attachment device 40 comprises a magnet or magnetic material so that instrument 11 or shaft member 12 can magnetically attach to stabilization member 20.

In another embodiment, instrument 11 or shaft member 12 itself comprises a feature or shape that acts as a receptacle to receive or coordinate with instrument attachment device 40, including but not limited to a ring, hole or socket that receives and secures to a projection or other feature at or near the top of stabilization member 20.

In these various ways, a user can have a number of instruments 11, and the user can easily attach his or her preferred stabilization member 20 into or onto the instrument attachment device 40.

System 10 comprises additional features that may enhance the ease of using instruments 11. In one embodiment, stabilization member 20 comprises magnet 22 at, near or on its bottom surface. With this feature, system 10 can be reliably placed vertically on metal trays, as perhaps best illustrated in FIGS. 1 and 2, because magnet 22 holds it in place vertically on the tray. This vertical placement makes it easier for users to distinguish each instrument 11. Such a feature also prevents instruments 11 from falling off the tray and allows the user to "grab and go" with the instruments, making the operation more efficient. Magnet 22 provides the user with a quick release/quick attachment that does not require alignment or any secondary actions such as rotary turns or compound push and turn connects that are common in the medical industry. As a result, the magnetic feature reduces procedure time that can directly lead to increases in patient throughput on a daily basis.

Figure 6:
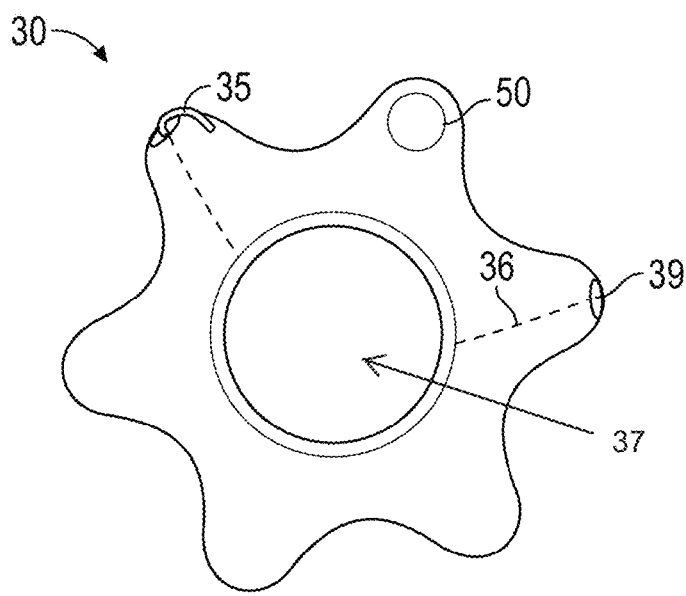
FIG. 6 is an illustration from a front view of a rotation member according to an embodiment of the present invention.

In another embodiment of system 10, one of or both of stabilization member 20 and rotation member 30 comprise light source 50, including but not limited to a light emitting diode (LED). If light source 50 is disposed on stabilization member 20, light source 50 is preferably disposed at or near the top of stabilization member 20 or on top of instrument attachment device 40. If light source 50 is disposed on rotation member 30, preferably at least one light source 50 is disposed on or within each projection 31 of rotation member 30 to provide consistent lighting as instrument 11 may rotate or roll, for example as shown in FIG. 6 showing the light source 50 embedded at least partially within rotation member 30. In another embodiment, light source 50 is touch, pressure or heat sensitive so that it turns on when the component of system 10 on which it is disposed is touched. To that end, embodiments of system 10 preferably comprise power sources and touch, pressure or heat sensors for the same.

Components of system 10, for example, stabilization member 20 and rotation member 30, need not always be used together. In one embodiment, rotation member 30 is used on instrument 11 without stabilization member 20.

System 10 also preferably works with the way instruments 11 are stored or cleaned, so that use of system 10 can be seamlessly used in the typical processes instruments 11 are employed. In another embodiment, attachment device 40 comprises a hinge that allows stabilization member 20 to rotate such that its primary axis is substantially parallel to the primary axis of instrument 11, so that instrument 11 and stabilization member 20 collapse to be vertically side-by-side. In this way, an instrument 11 with system 10 can be conveniently placed, for example in an autoclave or storage bin, without having to remove any component of system 10 from instrument 11.

Rotation Member 30 Generally.

Many instruments 11 have working ends 13 with a very precise tool that is inherently directional, that is, a sharp directed end that must be rotated to operate or apply force with it, for example, the directionally oriented pointed end of a dental scaler instrument or the blade of a scalpel. This means that much of the work burdening the user comes from rotating instrument 11 or adjusting its roll (rotation about its primary axis) in one direction or the other. If the user is using instrument 11 without the present invention, that means using the strength in the user's wrist to apply such a force to rotate or roll instrument 11, which typically also requires releasing user's grip on instrument 11 itself to readjust the user's hand position on instrument 11 to do so. Some instruments 11 are incapable of rotation at all. Rotation member 30 of the present invention addresses this problem by providing a structure that is fixed or fixable to instrument 11 to which the user's fingertips and/or sides of the fingers can be employed to apply such force, rather than the wrist which is more prone to strain and exhaustion. Rotation member 30 is in some embodiments capable of being removably attachable to instrument 11 and in other embodiments it is integral with or formed of the same material as shaft member 12 or the shaft of instrument 11, but either way, rotation member 30 is preferably fixable to instrument 11 such that any force applied to it rotates instrument 11.

Preferably, a single system 10 for use with a double-ended instrument 11 comprises at least two rotation members 30, one for each end of instrument 11, each disposed on instrument 11 on opposite sides of stabilization member 20. Most preferably, a two-ended instrument 11 comprises four rotation members 30, as illustrated in FIG. 1. The rotation members 30 are preferably spaced from each other on instrument 11. In such case, a first and second rotation member 30 are disposed on instrument 11 on one side of where stabilization member 20 would attach to instrument 11 and are spaced a first gap distance from each other. A third and fourth rotation members 30 are disposed on instrument 11 on the other side of where stabilization member 20 would attach to instrument 11 and are spaced a second gap distance from each other. The distance between the second and third rotation members 30 may be referred to as the third gap distance, which third gap distance is larger than the first and second gap distances.

These deliberate gaps preferably accommodate 5th to 95th percentile variances in hand sizes, allowing users with different hand sizes to grasp the instrument along its longitudinal axis in the most comfortable position. Preferably the first gap and second gap are at least about one millimeter, more preferably at least about three millimeters and most preferably at least about five millimeters. Preferably the third gap, or the distance between the rotation members 30 that are closest to where the stabilization member 20 attaches to instrument 11 is at least about 1 centimeter, more preferably at least about two centimeters, and most preferably at least about three centimeters.

Shape of Rotation Member 30 and its Projections 31.

Figure 4:
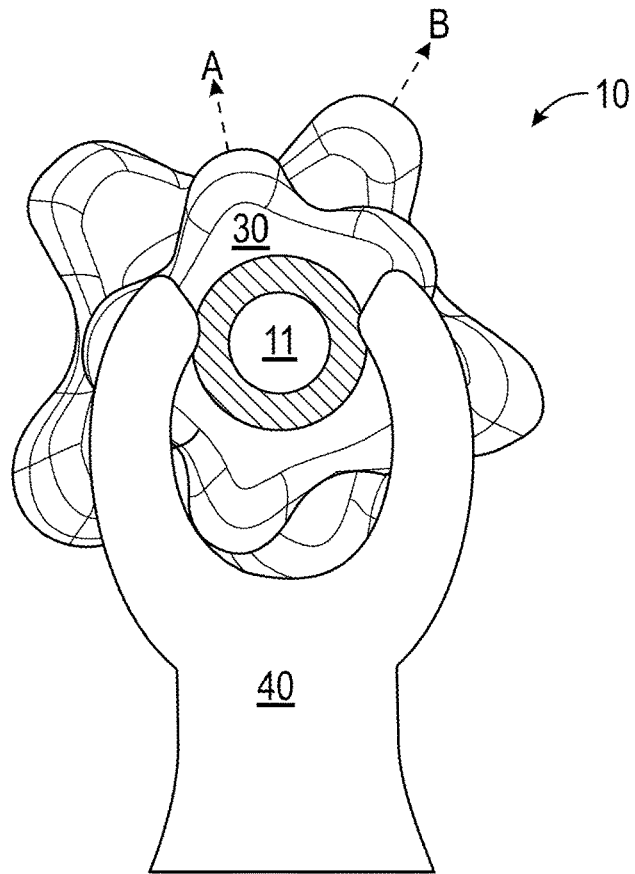
FIG. 4 is an illustration from a front view of the top of a stabilization member, showing the top of a stabilization member with an instrument attachment device, and a cross section of the instrument, according to an embodiment of the present invention.

Rotation member 30 is intended to provide the user of system 10 a surface or surfaces against which force can be applied for rotating instrument 11 itself, that is, controlling its roll (its rotation about its primary axis), and as a means to apply force with instrument 11 using the strength from the user's fingertips rather than the wrist. To that end, and referring to FIGS. 5A and 5B, rotation member 30 preferably comprises at least one projection 31 extending a surface a distance radially outward from rotation member 30, so that when rotation member 30 is disposed on instrument 11, there is a surface extending outward or in a direction perpendicular to or at least at some transverse angle to the primary axis of instrument 11. Projection 31 may be referred to herein as comprising a "projection axis", which axis is intended to refer to the axis extending from the center of the rotation member (which is also the center of instrument 11 or shaft member 12 if rotation member 30 is centered around such) radially outward through the most distant outer surface of the projection, for example as illustrated in FIG. 4 showing projection axis A for a first projection 31 and a projection axis B for a second projection 31 on a different rotation member 30.

Rotation member 30 preferably comprises a rigid structure that is sized and shaped to coordinate with the user's fingers and to entirely surround or encircle at least a portion of the circumference of instrument 11. Various shapes of rotation member 30 are illustrated in the figures, including FIGS. 1, 5A, 5B, 15, 18 and 19. Due to the nature of describing shapes, rotation member 30 may be described as having an overall shape or may be described in terms of particular features of parts of its form. In one embodiment, rotation member 30 comprises a star shape comprising a hole/cavity 37 extending entirely through its center through which instrument 11 is received. In another embodiment, rotation member 30 is gear-shaped comprising hole/cavity 37 through which instrument 11 is received. In another embodiment, rotation member 30 is a band that surrounds instrument 11 comprising a plurality of projections 31 of various dimensions and orientations. In another embodiment, rotation member 30 comprises a scalloped lobe, that is, it comprises a plurality of convex curves forming its outer surface. The scalloped lobe design allows users fingertips to have positive nonslip engagement with the instrument when articulating the instrument tip while applying pressure on the instrument for scaling. Projections 31 are preferably any shape that provides a surface that can receive a force normal to or transverse or at an angle to its surface, including but not limited to shapes that are convex, triangular, rectangular, curved, pointed, raised protrusions, ridges, barreled, double-star barreled, etc.

Rotation member 30 need not be symmetrical. In another embodiment, the shape of rotation member 30 is asymmetrical to provide varying sensory feedback to the user as to the degree of rotation or roll of instrument 11. This allows users to grasp and manipulate the instrument from a wide variety of approach angles, as needed, for example to accommodate access, precising and application of force at angles that are commonly encountered when accessing all four quadrants of the mouth if instrument 11 is being used in dentistry. For example, a first projection 31 has the greatest height, a second projection 31 has a height less than the height of the first projection 31, a third projection 31 has a height less than the height of the second projection 31, until the last projection 31 adjacent to the first projection 31 has the smallest height.

Rotation member 30 is preferably sized depending on the size of instrument 11 that rotation member 30 is intended to be used with. In one embodiment, rotation member 30 comprises a diameter at least as large as the diameter of the shaft of instrument 11. In another embodiment, rotation member 30 comprises a diameter at least as large as the diameter of a doorknob. In another embodiment, rotation member 30 comprises a diameter at least as large as the diameter of a jar lid.

Figure 19:
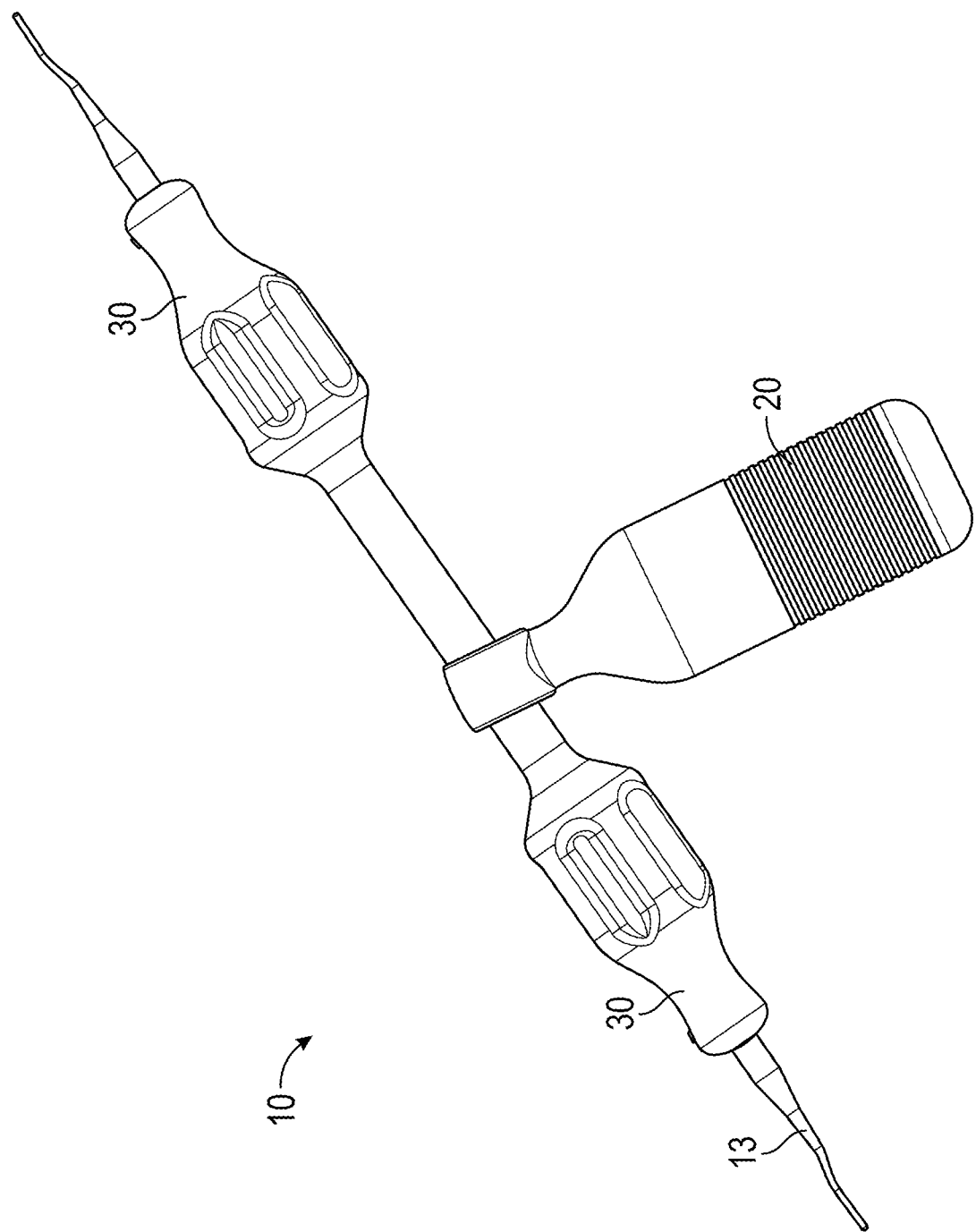
FIG. 19 is an illustration from a side view of an ergonomic instrument handling system according to an embodiment of the present invention.

Rotation member may comprise any number of projections 31. Preferably, rotation member 30 comprises at least two projections 31, and most preferably, five projections 31. As illustrated in FIGS. 1, 4, 5A, 5B, rotation member 30 comprises five projections 31, but of course other embodiments comprise other numbers of projections 31 as may be best suited for the particular instrument 11. Projections 31 preferably extend along the entire length of the handle of instrument 11, to give the user the most options in how they use their fingers to rotate instrument 11 using rotation member 30. In some embodiments, projections 31 extend only a portion of the length of the handle of instrument 11, preferably along the length beginning at or near the working end of instrument 11 and extending to that part of the handle of instrument 11 where the user's palm is likely to hold the handle or about halfway the length of handle of instrument 11. FIG. 19 illustrates an embodiment in which projections 31 do not extend along the entire length of rotation member 30. In some embodiments, projections 31 extend along the entire length of the handle of instrument 11, but their height (that is in this case, the distance from the surface of instrument 11 to the top of that particular projection 31) decreases as the projection 31 approaches the end of the handle end of instrument 11.

While projections 31 can each have their own shape or size, they are preferably integral with each other or formed as a single unitary object defining the outer surface of rotation member 30. It can be said that two projections 31 define a surface intended to coordinate, receive or be in contact with a user's digit, which surface may be referred to as a digit contact surface. Preferably, two projections 31 and the surface between them is generally continuous and form a concave-shaped surface having dimensions that generally coordinate with the curvature of at least one of the digits of the user's hand, or at least intended to contact a digit of the user's hand. While the use of the term "projection" is well known by those of ordinary skill in the art, it might further be defined as any shape, surface or object that projects, protrudes, juts out, sticks out, or otherwise extends a distance out from an adjacent surface or from a referenced section of the same surface. Such a projection may be formed by removing or adding material to create a low surface "valley" and a relatively high surface "ridge" adjacent to the valley, or by simply shaping the underlying material to have the intended shape.

How Rotation Member 30 Attaches to Instrument 11.

Rotation member 30 is preferably fixed or fixable to instrument 11 such that it remains in place on instrument 11 or such that instrument 11 cannot rotate or roll independent of rotation member 30 under any typical force that a human hand could apply to it in the operation of instrument 11. The following discussion describes various ways in which rotation member 30 is attached to or otherwise disposed on instrument 11.

1. Embodiments in which Rotation Member 30 is Integral with Shaft Member 12.

Figure 13:
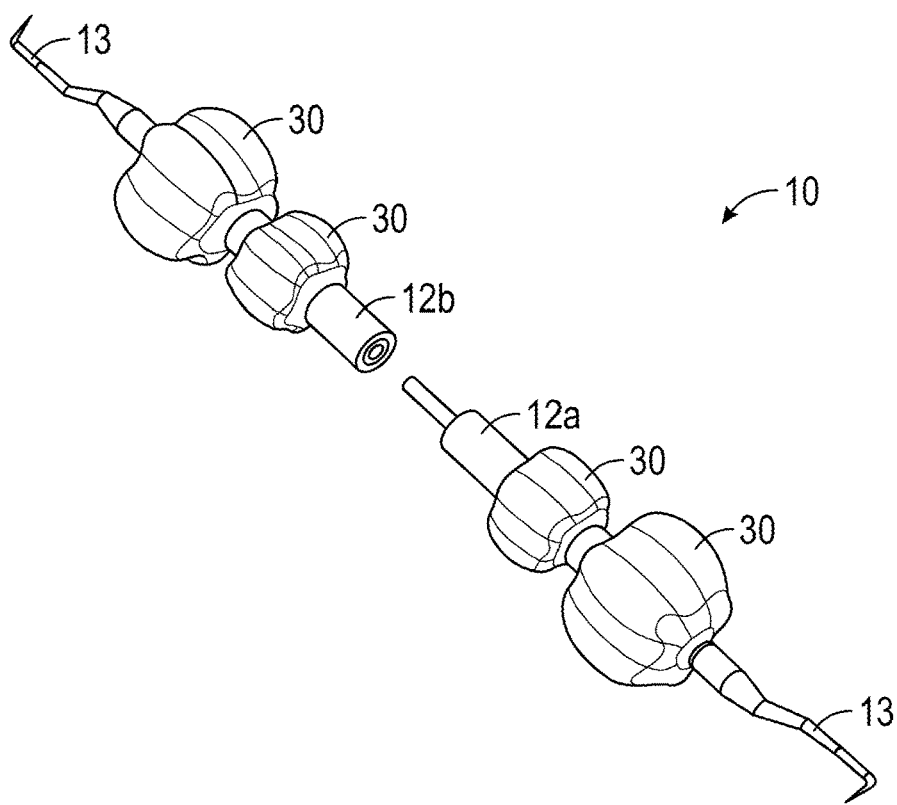
FIG. 13 is an illustration from a perspective view of a system with four rotation members and two shaft members in which the first shaft member screws into the second shaft member, according to an embodiment of the present invention.
Figure 14:
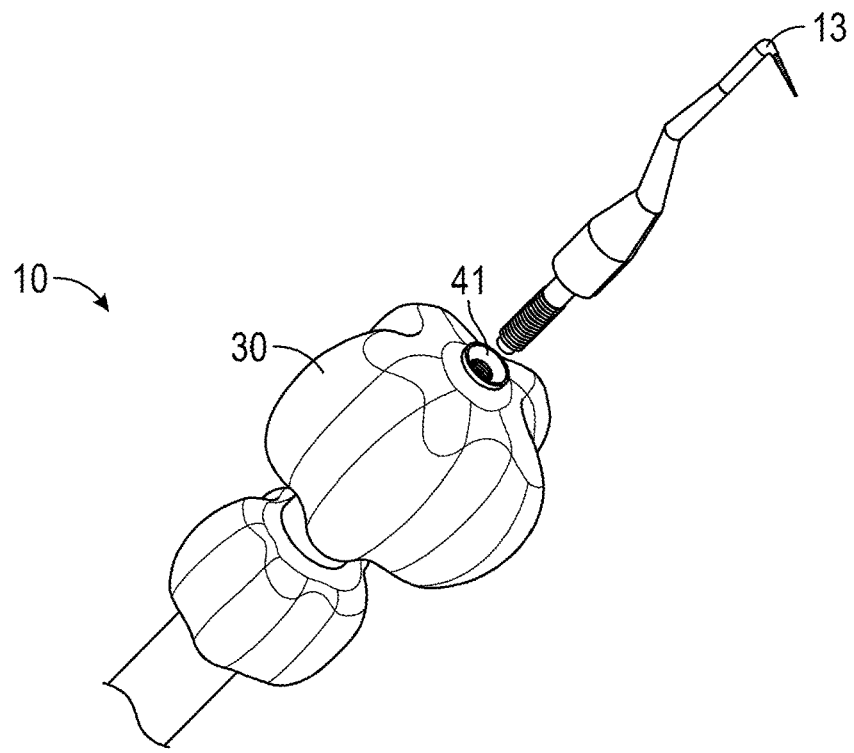
FIG. 14 is an illustration from a perspective view of two rotation members and an instrument coordination member receiving the screw of an instrument working end according to an embodiment of the present invention.
Figure 15:
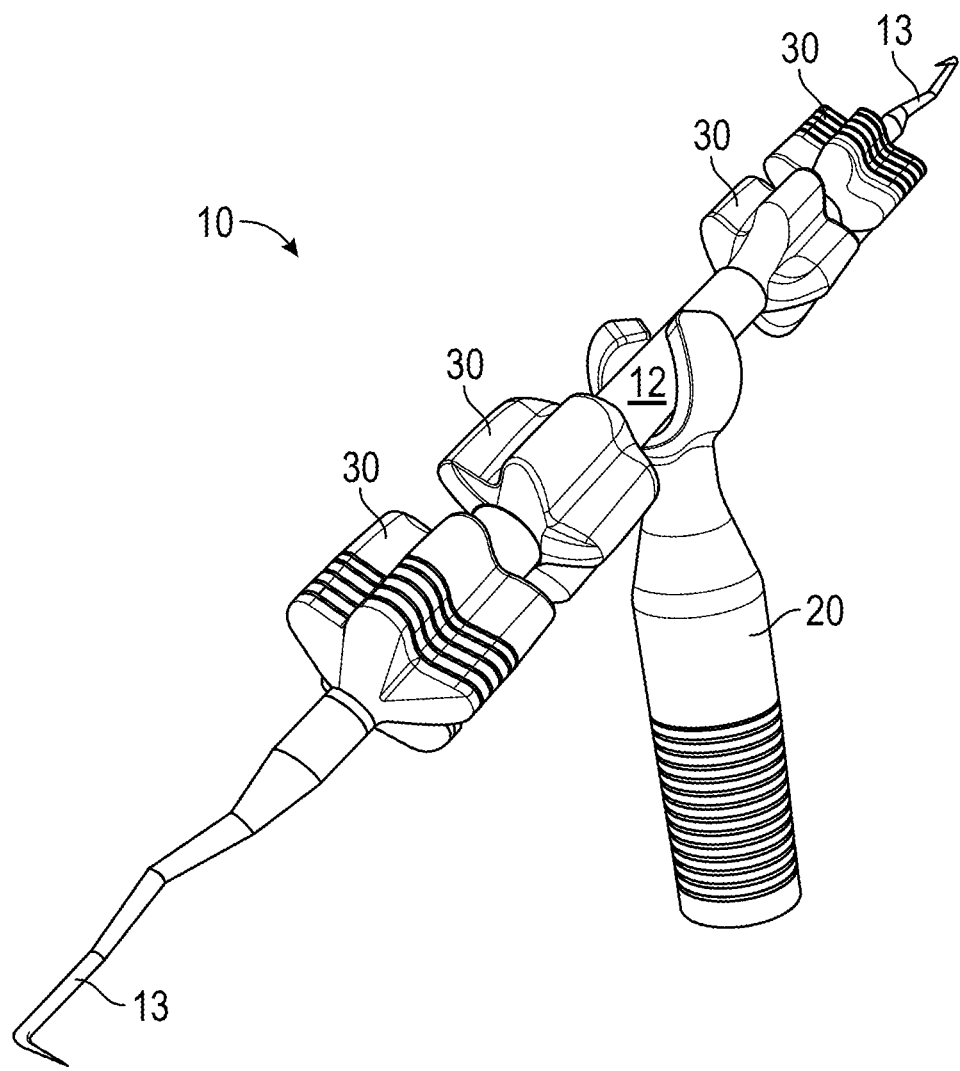
FIG. 15 is an illustration from a perspective view of an ergonomic instrument handling system including a stabilization member and four rotation members according to an embodiment of the present invention.

In some embodiments, at least one rotation member 30 is formed integrally with instrument 11 or at least what serves as the shaft of instrument 11, namely, shaft member 12, for example as illustrated in FIGS. 1 and 13. Shaft member 12 may separate into components thereof, such as first shaft member part 12*a* and second shaft member part 12*b* as perhaps best illustrated in FIG. 13. When rotation member 30 is formed integrally with shaft member 12 or any of its components, rotation member 30 can be prefabricated to already incorporate shaft member 12 that coordinates with working ends. Rotation member 30 is preferably of the same continuous material as shaft member 12. In a sense, it can be said that instrument 11 itself comprises rotation member 30 as part of it or otherwise comprises a shape of rotation member 30 such that instrument 11 and rotation member 30 are unitary and/or formed of the same single object. In this way, instrument 11 as sold, would already have rotation member 30 built into it.

In another embodiment, rotation member 30 is a different material than shaft member 12 but is made integral with it by virtue of some integration process, including but not limited to welding, melting, fusing, or gluing.

2. Embodiments in which Rotation Member 30 Attaches by Friction or Magnetically.

Figure 5A:
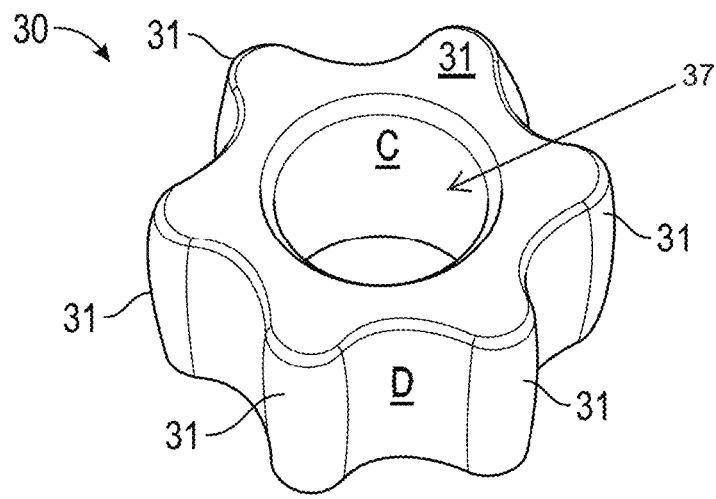
FIGS. 5A and 5B are illustrations from various perspective views of a rotation member according to an embodiment of the present invention.
Figure 5B:
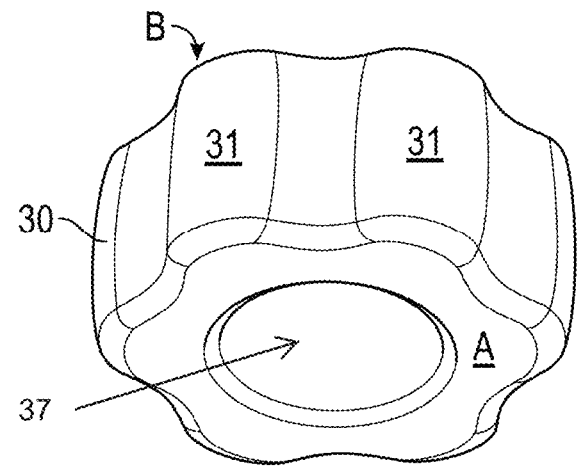

In some embodiments, at least one rotation member 30 is capable of being slid onto instrument 11 or a shaft member 12. Referring to FIGS. 5A and 5B, the instrument 11 or shaft member 12 is preferably inserted into hole/cavity 37 within rotation member 30. In one embodiment, the friction of the material of rotation member 30 secures rotation member to instrument 11. In another embodiment, hole/cavity 37 comprises a diameter about only as large as or smaller than the diameter of the shaft of instrument 11 itself or shaft member 12.

In another embodiment, rotation member 30 comprises a slit oriented in the same direction as its longitudinal axis extending all the way from its first facing end to its second facing end, so that instrument 11 can simply be inserted within rotation member 30 via the slit (or in other words rotation member 30 can be wrapped at least partially around instrument 11). As used herein, the term "facing end" is intended to refer to that end or surface of rotation member 30 formed by the distance between its inner surface to its outer surface, for example as shown in FIG. 5B showing a first facing end A and the opposite facing end B. The "inner surface" of rotation member 30 is that surface intended to contact instrument 11, which inner surface forms hole/cavity 37, as shown as surface C in FIG. 5A. The "outer surface" of rotation member 30 is that surface that is intended to contact the user's hand when in use, as shown as surface D in FIG. 5A. Whenever rotation member 30 is attached to instrument 11 by such a slit, preferably rotation member 30 is formed of a material with some elasticity (for example, rubber or elastomer), so that friction can be employed to keep it stuck to instrument 11 so that instrument 11 rotates in step with any rotation of rotation member 30.

Figure 7A:
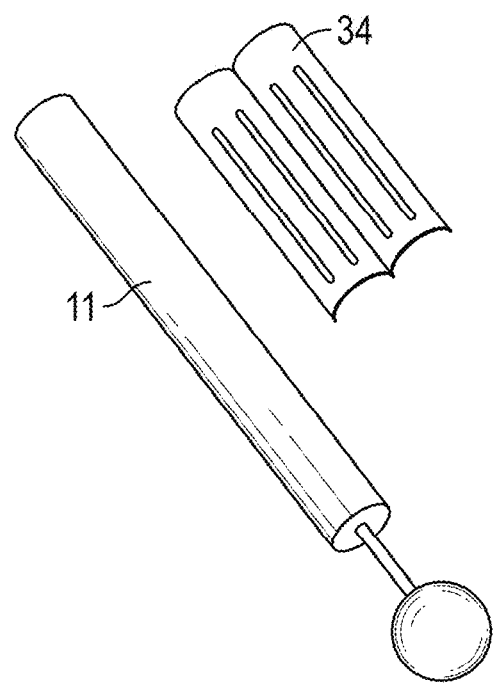
FIGS. 7A and 7B are illustrations from a perspective view of a sheath as used with an instrument.
Figure 7B:
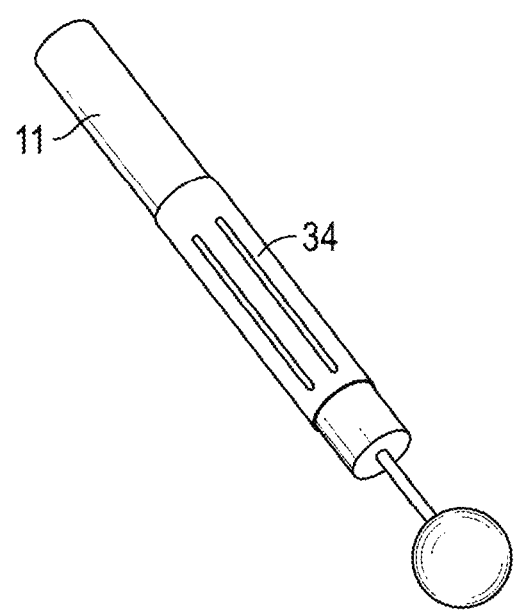
Figure 7C:
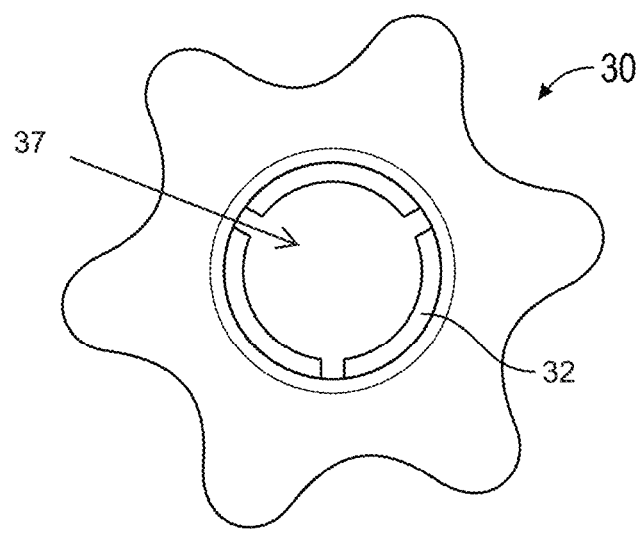
FIG. 7C is an illustration from a front view of a rotation member capable of coordinating with the sheath of FIGS. 7A and 7B, according to an embodiment of the present invention.

Referring to FIGS. 7A, 7B and 7C, system 10 comprises sheath 34 which at least partially encircles the shaft of instrument 11. Preferably, sheath 34 comprises an outer surface with shapes, features, projections, rails, grooves or material that coordinate with shapes, features, projections or material on the inner surface of rotation member 30 that will slide on over sheath 34. For example, male rails on the outer surface of sheath 34 may coordinate with female rail receptacles on the inner surface of rotation member 30. Sheath 34 is preferably disposed on instrument 11 itself to increase the diameter of instrument 11 to better secure rotation member 30 to it, or to provide a material that provides more friction or a more comfortable feel to the user's hands. In such case, sheath 34 preferably comprises any material for that purpose, including but not limited to polymers, plastics, and rubbers. In another embodiment, sheath 34 comprises projections, points, indentations, contours or any other features at varying points along its length that allow rotation member 30 to be secured at such points, for example so that rotation member 30 can be slid on the sleeve disposed on instrument 11 to lock at different positions on instrument 11, for example, as illustrated in FIGS. 7A, 7B and 7C. In another embodiment, rotation member 30 comprises at least one magnet or magnetic material that coordinates with a magnet or magnetic material on sheath 34 or on instrument 11 itself. For example, in one embodiment, sheath 34 comprises a magnet or magnetic material on its outer surface and the inner surface of rotation member 30 comprises a magnet or magnetic material. Once rotation member 30 slides onto sheath 34, it is held securely by magnetism to the sheath. In another embodiment, rotation member 30 is slid first onto instrument 11 itself directly, and subsequently sheath 34 is slid or otherwise attached to instrument 11 and the magnetism between sheath 34 and rotation member 30 keeps rotation member 30 in place on instrument 11.

3. Embodiments in which Rotation Member 30 Attaches Mechanically.

In some embodiments, rotation member 30 comprises at least one mechanical fixing device 32 that applies a force fixing it to instrument 11, including but not limited to a screw, clip, clamp, hinge, strap, spring, threaded hole for receiving a screw, pin, receptacle for receiving a pin, bolt, cylindrical bearing seat, bearing inner ring, setscrew, locking collar, claim collar, adapter sleeve, or any combination thereof, for example as illustrated in FIGS. 6, 8, 9 and 10 and described below, which is a non-exhaustive list of the possibilities.

In another embodiment, rotation member 30 can be opened and closed around the shaft of instrument 11. Referring to the embodiment illustrated in FIG. 6, rotation member 30 comprises breach 36, which is a cut, division, separation etc. along the entire width of rotation member 30, in a direction oriented transverse or at an angle to the longitudinal axis of rotation member 30, permitting rotation member 30 to split open or otherwise simply wrap around or enclose upon instrument 11 once instrument 11 is inserted into the two attached halves of rotation member formed by breach 36. Such embodiments preferably include means for keeping the two split halves of rotation member 30 together, including but not limited to a hinge 39, as for example shown in FIG. 6. In some embodiments, rotation member 30 comprises closing devices 35 disposed at, on or near breach 36 to close breach 36 or otherwise keep instrument 11 from unintentionally exiting it, including but not limited to clips, hook and loop fasteners, Velcro, straps, hinges, zip-ties, etc.

Figure 8:
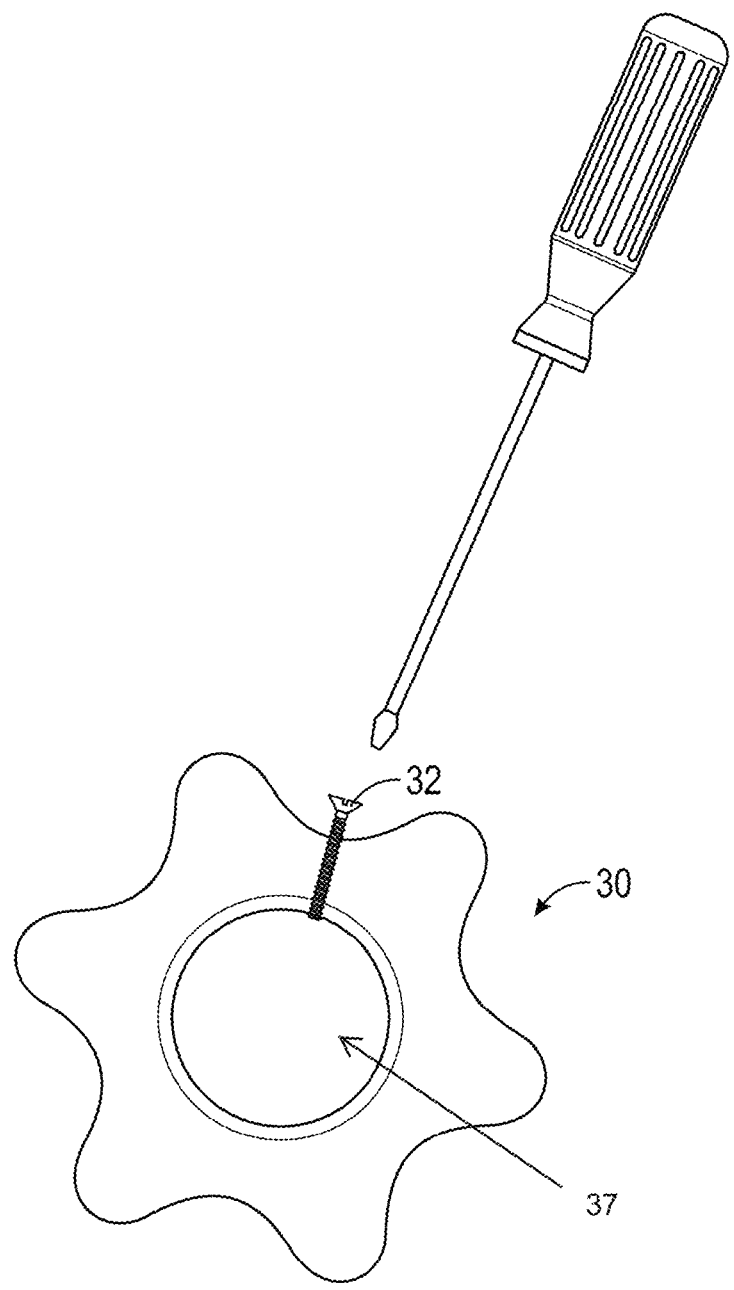
FIG. 8 is an illustration from a front view of a rotation member with a screw according to an embodiment of the present invention.

Referring to the embodiment illustrated in FIG. 8, mechanical fixing device 32 comprising screw 32 and/or threaded hole capable of receiving a screw is embedded with rotation member 30, to extend from its outer surface to and through its inner surface to contact instrument 11, apply force to it, and thereby secure rotation member 30 to it. Such mechanical fixing device 32 may also be employed in coordination with sheath 34, in which the screw contacts sheath 34 instead of instrument 11 itself. In another embodiment, mechanical fixing device 32 comprises a bolt or pin instead of or in combination with the screw.

Figure 9:
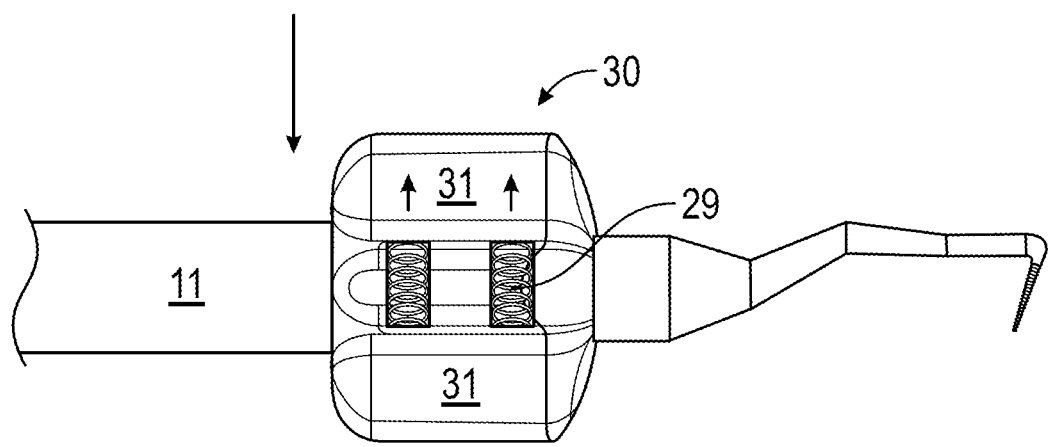
FIG. 9 is an illustration from a side view of a rotation member with springs according to an embodiment of the present invention.

In another embodiment, mechanical fixing device 32 comprises springs 29, for example as illustrated in FIG. 9. The user applies a force to rotation member 30, for example by squeezing it, which in turn pushes the springs and unlocks the rotation member, increasing its diameter so that it can slide along the shaft of instrument 11 to the preferred position. Upon the user letting go or releasing the squeeze of the rotation member 30, it preferably locks in place by using the springs to apply a force either to rotation member 30 itself or directly to instrument 11.

In another embodiment, mechanical fixing device 32 comprises a zip-tie. Preferably, rotation member 30 comprises breach 36, as illustrated in FIG. 6 allowing rotation member 30 to open and close. The zip-tie mechanism of mechanical fixing device 32 is preferably disposed on rotation member 30 such that it locks when rotation member 30 is closed and unlocks when it is open. In another embodiment, rotation member 30 comprises a hole within rotation member 30 through which the zip-tie passes. In another embodiment, rotation member 30 comprises a female receptacle for the zip-tie that locks it in place when the zip-tie is inserted or releases it when a button is pressed on the zip-tie mechanism.

In another embodiment, rotation member 30 comprises at least one band that is disposed on or around rotation member 30 to apply a force to secure it to instrument 11. In such an embodiment, rotation member 30 preferably comprises a flexible material that compresses enough to be squeezed between the band and instrument 11. The band is preferably formed of rubber. Rotation member 30 may comprise shapes or features, including but not limited to indentations or grooves, that coordinate with the bands to keep them in place.

Figure 10:
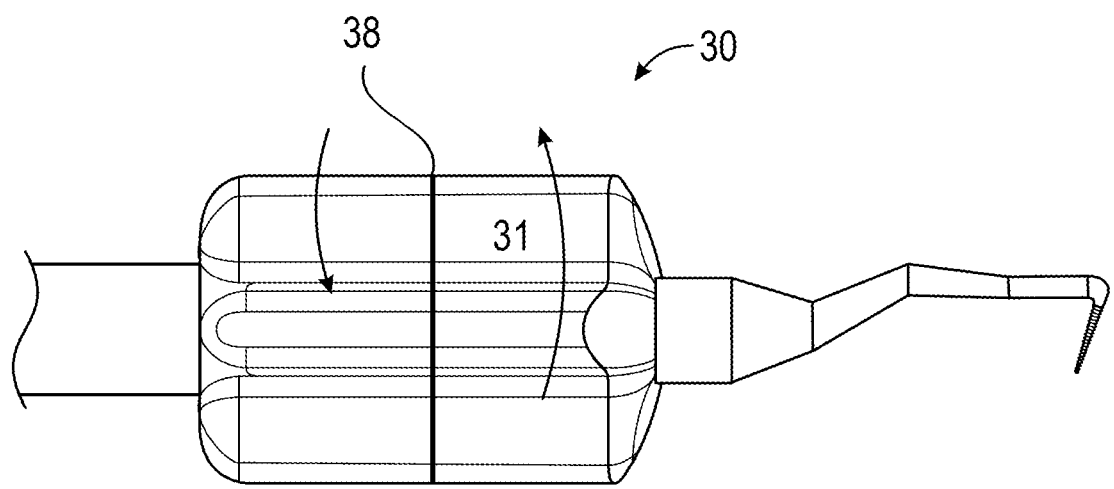
FIG. 10 is an illustration from a side view of a rotation member capable of being twisted to secure to an instrument, according to an embodiment of the present invention.
Figure 11:
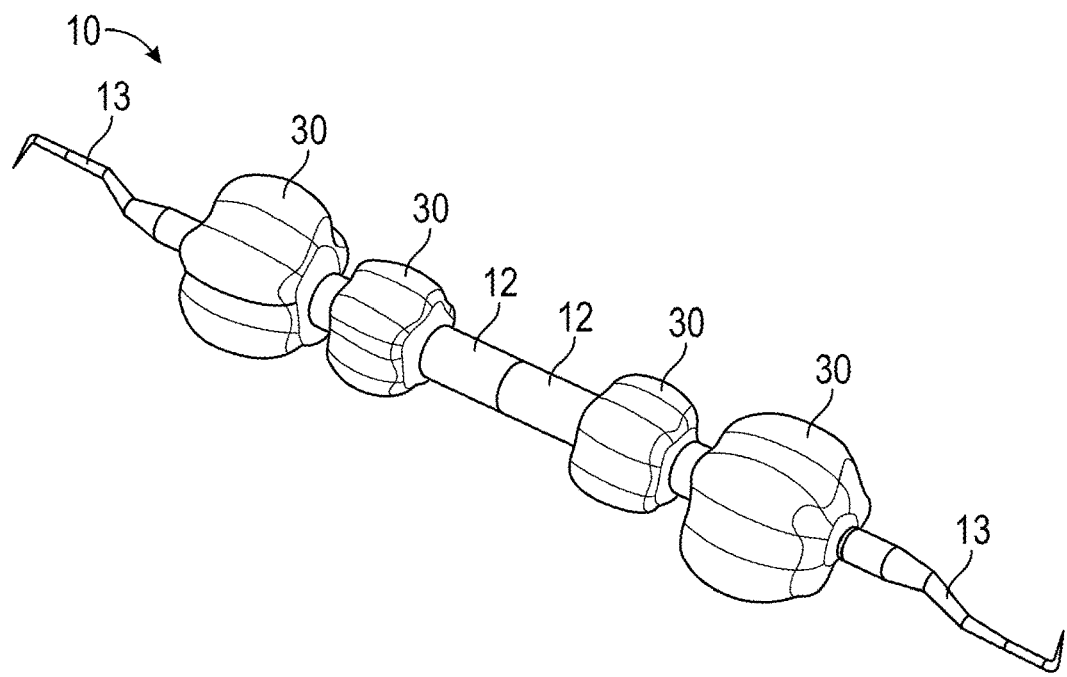
FIG. 11 is an illustration from a perspective view of four rotation members disposed on or integrated with a dental instrument, two of which rotation members are integrally formed with a first shaft member, the shaft member capable of coordinating with a second shaft member which is integrally formed with the other two rotation members, according to an embodiment of the present invention.
Figure 12:
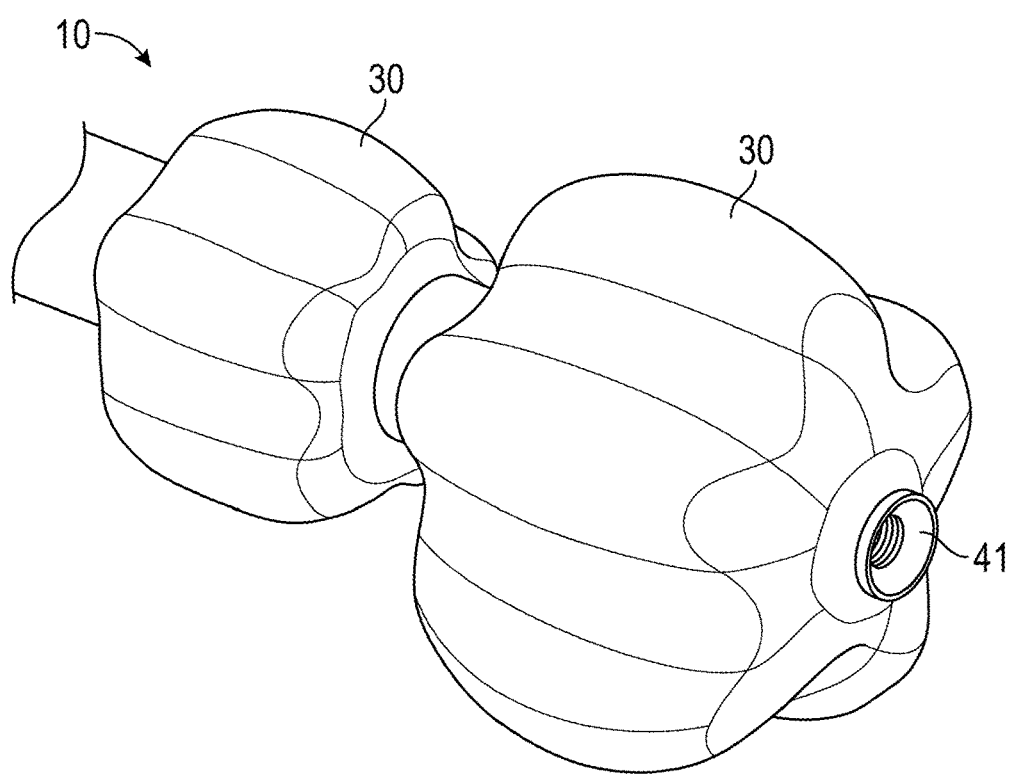
FIG. 12 is an illustration from a perspective view of two rotation members and an instrument coordination member according to an embodiment of the present invention.

In another embodiment, rotation member 30 or a single projection 31 thereof is pressed, twisted or rotated to apply a force against instrument 11, for example by mechanical fixing device 32. Referring to FIG. 10, rotation member 30 comprises seam 38 generally perpendicular or at least transverse to the longitudinal axis of rotation member 30 that separates it into a first and second half vertically, each of which can be twisted relative to the other or in opposite directions to tighten or loosen rotation member 30 to instrument 11 via a mechanical fixing device 32 embedded within it.

In another embodiment, rotation member 30 comprises a power source, including but not limited to a battery, and mechanical fixing device 32 is electronically controlled by either a button on rotation member or a remote control.

Materials, Shape and Size of Rotation Member 30.

Rotation member 30 is preferably formed of a rigid material capable of maintaining its structural integrity under force of a human hand, including but not limited to elastomer, rubber, plastic/polymer, foam, etc., and any combination thereof. In another embodiment, rotation member 30 comprises a material that is shapeable or malleable by the user's hands, including but not limited to putty or foam. In this way, the user can modify the particular shape of rotation member 30 to their ergonomic needs. In some embodiments, rotation member 30 comprises a combination of a rigid material that is not malleable or shapeable by the human hand with a material that is malleable or shapeable by the human hand, in order to provide a rigid structure that is only modifiable to a certain extent.

Rotation member 30 may be colored with a paint so that it can be distinguished from other tools, instruments or other rotation members 30. For example, in one embodiment, a first rotation member 30 comprises a first color to represent its use with a first instrument 11 (e.g. an interior scaler instrument) and a second rotation member 30 comprises a second color to represent its use with a second instrument 11 (e.g. posterior scaler instrument). This is particularly useful where the facility has multiple users of multiple instruments 11.

With rotation member 30 as described above, embodiments of the present invention are also helpful to users who are simultaneously looking through a microscope or other optical enhancements, because rotation member 30 provides additional tactile or sensory input to the user, improving their control of the instrument 11. Additionally, rotation member 30 opens up the user's grip on instrument 11, decreasing the chance of injuries (for example, carpal tunnel and trigger thumb) known to be caused by pinch grip. Additionally, rotation member 30, in providing additional surface against which the user can apply force or pull, allows the user to retract instrument 11 (for example, by pulling up and away from the surface being operated on, such as the root surface of a tooth) without having to employ such force through a pinch grip. Instead, the user uses his or her fore or middle finger in a pulling motion as if pulling on a latch. The thumb is minimally employed in this action, if at all.

How Stabilization Member 20 can be Used with Instrument 11.

As described herein, one of the objectives of system 10 is to be capable of retrofitting to instrument 11 without modification to instrument 11. This allows the separate sale of system 10 without unique modifications by manufacturers of instrument 11. However, in some embodiments of system 10, instrument 11 is modified, or at least system 10 serves as the shaft of instrument 11 itself by providing a shaft to which working ends 13 are attached, some of which embodiments are already described above. In some embodiments, instrument 11 itself comprises projections, points, indentations, contours or any other features at varying points along its length that allow rotation member 30 and/or stabilization member 20 to be secured to instrument 11 at such points, for example so that rotation member 30 can be slid on instrument 11 to lock at different positions on instrument 11. In another embodiment of system 10, system 10 comprises shaft member 12 to serve as the shaft of instrument 11, which shaft member 12 comprises working ends 13 on at least one of its ends integrated with it or an instrument coordination member 41 that permits a working end to be removably attached so that the working ends of instrument 11 can be replaced or switched to different types of working ends without having to remove or modify any component of system 10 disposed on instrument 11. Instrument coordination member 41 preferably comprises any feature capable of coordinating with a working end 13, including but not limited to a threaded hole, screw, pin hole, pin, latch, ring, receptacle, etc. For example, in one embodiment in which instrument 11 is a toothbrush and rotation member 30 is disposed on the handle of instrument 11, instrument 11 comprises a receptacle on one of its ends to receive and attach the working end brush. In another embodiment, system 10 including both stabilization member 20 and rotation member 30 is disposed on a handle of instrument 11 and instrument 11 comprises instrument coordination member 41 at one or both of its working ends to receive professional dental heads including but not limited to scalers, scrapers, mirrors, etc.

Some instruments 11 comprise only one working end, the other end simply being a handle for the user. In some embodiments of system 10, rotation member 30 slips over or covers or encircles at least a portion of the handle end of instrument 11. For example, in one embodiment, rotation member 30 comprises a shape comprising an elongated shape to partially slip over, cover or encircle the handle end of instrument 11. In another embodiment, rotation member 30 is actually closed on one end, that is, one end comprises an opening to receive the handle of instrument 11 and the other end comprises a barrier. In this way, rotation member 30 slips on the handle of instrument 11 and stops slipping at the point instrument 11 meets the closed end of rotation member 30. In some embodiments, the two ends of rotation member 30 are both open, that is, both comprise an opening, which allows rotation member 30 to slip any desired distance up or down the handle of instrument 11.

Example

The invention is further illustrated by the following non-limited example, which refers to FIGS. 1-4 and 11-14.

A system 10 was manufactured comprising stabilization member 20. Stabilization member 20 comprises an elongated cylindrical shape that tapers at or near its top end, to serve as a handle for the user's hand. Stabilization member 20 included an instrument attachment device 40 at its top end that comprises a u-shaped feature sized to at least partially surround the shaft of instrument 11. The height of stabilization member 20 from its bottom to its top (including instrument attachment device 40) was about four inches. Stabilization member 20 further included a magnet 22 at or near its bottom to secure it in place on a tray. Stabilization member 20 also included grooves encircling its circumference along a portion of its length to reduce slipping of the hand and provide tactility.

System 10 was manufactured comprising four rotation members 30. Each rotation member 30 had the shape of a three-dimensional five-pointed star with curved edges. Such a shape is defined by five projections 31 that form the star points, the ends of the star points being both curved along the longitudinal axis of the rotation member as well as curved along the perimeter of the ends of the star's points. Two of the four rotation members 30 were integrally formed to each other with a shaft 12a, those two rotations members 30 referred to herein as the first and second rotation members, and the other two rotation members 30 referred to herein as the third and fourth rotation members were integrally formed with a second shaft member 12b. One end of the first shaft member 12a included a screw to coordinate with a threaded hole in an end of the second shaft member 12b. When joined together, the first and second shaft members 12a and 12b are simply referred to herein as the shaft 12, which shaft including the rotation members had a length of about four inches from one end to the other. One end of the first rotation member (or the end of the shaft 12a opposite the end with the screw) included an instrument coordination member 41 comprising a threaded screw hole to receive an instrument working end. One end of the fourth rotation member (or the end of the shaft 12b opposite the end with the screw hole) also included an instrument coordination member 41 comprising a threaded screw hole to receive an instrument working end.

The first and fourth rotation members 30 were sized larger than the second and third rotation members 30. The minimum and maximum diameters of this configuration were scaled to elicit trilateral grip architectures that allow the users hands to perform in a more biomechanical efficient work envelope. Preferably, the difference in height between the highest point of a projection on first rotation member 30 and the highest point of a projection on the second rotation is at least about two millimeters, more preferably at least about three millimeters and most preferably at least about five millimeters.

The first rotation member 30 was oriented and disposed relative to the second rotation member 30 such that the projection axis of each of the first rotation member's projections were out of alignment with the projection axis of each of the second rotation member's projections. That is, their projection axes were transverse or at an angle to each other, as illustrated in FIG. 4. This enhanced functionality and reduced pinching the user's digits, and enhanced tactility and functionality.

The user screwed shaft member 12a into shaft member 12b, screwed in a first working end that was a scaler into the instrument coordination member 41 of the first rotation member 30 and screwed in a second working end that was a mirror into the instrument coordination member 41 of the fourth rotation member 30, thereby forming instrument 11. The user placed instrument 11 into stabilization member 20 by snapping it into the instrument attachment device 40.

With a single hand, the user held stabilization member 20 by wrapping the little finger, ring finger and middle finger around the stabilization member 20, and used the thumb and index finger to apply force to surfaces on the first rotation member 30 to rotate instrument and perform precise movements.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another. In the specification and claims, "about" or "approximately" means within twenty percent (20%) of the numerical amount cited.

What is claimed is:

1. A system for handling a hand-held instrument comprising a shaft, the system comprising:
    a first rotation member integrally formed with a first shaft member of the shaft of the hand-held instrument, the first rotation member comprising
       a width less than the breadth of a human user's hand,
       a longitudinal axis oriented in the direction of the length of the first rotation member,
       an outer surface,
       a plurality of projections each of which extend a distance in a direction that is normal to the longitudinal axis of the first rotation member, the plurality of projections defining at least two digit contact surfaces on the outer surface of the first rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the first rotation member, rotate the first rotation member about its longitudinal axis, and pull against the rotation member in a direction along its longitudinal axis, and thereby control the hand-held instrument;
    a first working end coordinating member disposed on a first end of the first shaft member and capable of securing to an instrument working end;
    a second rotation member integrally formed with the first shaft member, the second rotation member comprising
       a width less than the breadth of a human user's hand,
       a longitudinal axis oriented in the direction of the length of the second rotation member,
       an outer surface,
       a plurality of projections each of which extend a distance in a direction that is normal to the longitudinal axis of the second rotation member, the plurality of projections defining at least two digit contact surfaces on the outer surface of the second rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the second rotation member, rotate the second rotation member about its longitudinal axis, and pull against the second rotation member in a direction along its longitudinal axis, and thereby control the hand-held instrument,
    a second working end coordinating member disposed on a second end of the first shaft member and capable of securing to an instrument working end; and
    a stabilization member having a bottom end and a top end, the stabilization member comprising an elongated shape capable of being held by or in the hand of the user, the top end comprising an instrument coordination member capable of attaching the stabilization member to the shaft of the hand-held instrument.

2. The system of claim 1, wherein the plurality of projections of the first rotation member comprises at least five projections, and the at least two digit contact surfaces of the first rotation member comprise at least five contact surfaces.

3. The system of claim 1, wherein the at least two digit contact surfaces of the first rotation member extend along the entire length of the first rotation member.

4. The system of claim 1, wherein the instrument coordination member comprises a shape that at least partially surrounds but does not entirely surround the shaft of the hand-held instrument.

5. The system of claim 1, wherein the instrument coordination member comprises one of the mechanical devices selected from the group consisting of: a clip, a clamp, a hinge, a strap, a spring, and a ball joint.

6. The system of claim 1, wherein the instrument coordination member comprises a cavity or hole of a diameter that is no greater than about the greatest diameter of the hand-held instrument.

7. The system of claim 1, wherein the stabilization member further comprises a magnet disposed on, at or near its bottom end.

8. The system of claim 1 wherein the first rotation member is closer to the first end of the first shaft member than the second rotation member, and the second rotation member is closer to the second end of the first shaft member than the first rotation member, each of the plurality of projections of the first and second rotation members comprise a projection axis extending from the center of the first shaft member radially outward through the most distant outer surface of each projection, wherein the projection axis of at least one of the plurality of projections on the first rotation member is oriented transverse or at an angle to the projection axis of at least one of the plurality of projections on the second rotation member.

9. The system of claim 8 further comprising:
    a third rotation member integrally formed with a second shaft member of the shaft of the hand-held instrument, the third rotation member comprising
       a width less than the breadth of a human user's hand,
       a longitudinal axis oriented in the direction of the length of the third rotation member,
       an outer surface,
       a plurality of projections each of which extend a distance in a direction that is normal to the longitudinal axis of the third rotation member, the plurality of projections defining at least two digit contact surfaces on the outer surface of the third rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the third rotation member, rotate the third rotation member about its longitudinal axis, and pull against the third rotation member in a direction along its longitudinal axis, and thereby control the hand-held instrument;

a fourth rotation member integrally formed with the second shaft member of the hand-held instrument, the fourth rotation member comprising
a width less than the breadth of a human user's hand,
a longitudinal axis oriented in the direction of the length of the fourth rotation member,
an outer surface,
a plurality of projections each of which extend a distance in a direction that is normal to the longitudinal axis of the fourth rotation member, the plurality of projections defining at least two digit contact surfaces on the outer surface of the fourth rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the fourth rotation member, rotate the fourth rotation member about its longitudinal axis, and pull against the fourth rotation member in a direction along its longitudinal axis, and thereby control the hand-held instrument;

a first working end coordinating member disposed at a first end of the second shaft member capable of securing to an instrument working end and a second working end coordinating member disposed at a second end of the second shaft member and capable of securing to an instrument working end.

10. The system of claim 9 wherein the first and fourth rotation members are larger in size than the second and third rotation members, and the third rotation member is disposed on the second shaft member closer to the first end of the second shaft member than the fourth rotation member, and the fourth rotation member is disposed on the second shaft member closer to the second end of the second shaft member than the third rotation member.

11. The system of claim 10, wherein the stabilization member is attached to the first or second shaft member between the second and third rotation members.

12. The system of claim 11, wherein the instrument coordination member comprises a shape that at least partially surrounds but does not entirely surround the shaft of the hand-held instrument.

13. The system of claim 12 wherein the stabilization member further comprises a magnet disposed on, at or near its bottom end.

14. The system of claim 13 wherein the first instrument working end of the first shaft member comprises a scaler, the second instrument working end of the first shaft member comprises a screw or threaded hole, the first working end of the second shaft member comprises a screw or threaded hole, and the second working end of the second shaft member comprises a mirror.

15. A system for handling a hand-held instrument comprising a shaft, the system comprising:
a first rotation member capable of coordinating with a hand-held instrument and capable of at least partially surrounding the shaft of the hand-held instrument, the first rotation member comprising
a width less than the breadth of a human user's hand,
a longitudinal axis oriented in the direction of the length of the first rotation member,
an outer surface,
a plurality of projections each of which extend a distance in a direction that is normal to the longitudinal axis of the first rotation member, the plurality of projections defining at least two digit contact surfaces on the outer surface of the first rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the first rotation member, rotate the first rotation member about its longitudinal axis, and pull against the first rotation member in a direction along its longitudinal axis, and thereby control the hand-held instrument the first rotation member may be coordinated with;

a first working end coordinating member disposed at a first end of the shaft of the hand-held instrument and capable of securing to an instrument working end; and
a stabilization member having a bottom end and a top end, the stabilization member comprising an elongated shape capable of being held by or in the hand of the user, the top end comprising an instrument coordination member capable of attaching the stabilization member to the shaft of the hand-held instrument.

16. The system of claim 15, wherein the first rotation member comprises an inner surface capable of contacting and at least partially surrounding the shaft of the hand-held instrument, the inner surface comprising a material selected from the group consisting of: rubber, silicone, elastomer, foam, polymer, plastic and combinations thereof.

17. The system of claim 15, wherein the instrument coordination member comprises one of the mechanical devices selected from the group consisting of: a clip, a clamp, a hinge, a strap, a spring, and a ball joint.

18. The system of claim 15 wherein the stabilization member is attached to the shaft of the hand-held instrument between the first rotation member and a second end of the shaft of the hand-held instrument.

19. A system for handling a hand-held instrument comprising a shaft, the system comprising:
a first rotation member capable of coordinating with a hand-held instrument and capable of at least partially surrounding the shaft of the hand-held instrument, the first rotation member comprising
a width less than the breadth of a human user's hand,
a longitudinal axis oriented in the direction of the length of the first rotation member,
an outer surface, a plurality of projections each of which extend a distance in a direction that is normal to the longitudinal axis of the first rotation member, the plurality of projections defining at least two digit contact surfaces on the outer surface of the first rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the first rotation member, rotate the first rotation member about its longitudinal axis, and pull against the first rotation member in a direction along its longitudinal axis, and thereby control the hand-held instrument the first rotation member may be coordinated with;

a first working end coordinating member disposed at a first end of the shaft of the hand-held instrument and capable of securing to an instrument working end;

a second rotation member capable of coordinating with a hand-held instrument and capable of at least partially surrounding the shaft of the hand-held instrument, the second rotation member comprising a width less than the breadth of a human user's hand, a longitudinal axis oriented in the direction of the length of the second rotation member, an outer surface, a plurality of projections each of which extend a distance in a direction that is normal to the longitudinal axis of the second rotation member, the plurality of projections defining at least two digit contact surfaces on the outer surface of the second rotation member, each of the at least two digit contact surfaces shaped and sized so that a first digit of the user's hand may apply a force against a first digit contact surface of the at least two digit contact surfaces and a second digit of the user's hand may apply a force against a second digit contact surface of the at least two digit contact surfaces, the at least two digit contact surfaces shaped and sized to permit the user to grip the second rotation member, rotate the second rotation member about its longitudinal axis, and pull against the second rotation member in a direction along its longitudinal axis, and thereby control the hand-held instrument the second rotation member may be coordinated with, a second working end coordinating member disposed at a second end of the shaft of the hand-held instrument and capable of securing to an instrument working end; and a stabilization member having a bottom end and a top end, the stabilization member comprising an elongated shape capable of being held by or in the hand of the user, the top end comprising an instrument coordination member capable of attaching the stabilization member to the shaft of the hand-held instrument.

20. The system of claim 19, wherein the instrument coordination member comprises one of the mechanical devices selected from the group consisting of: a clip, a clamp, a hinge, a strap, a spring, and a ball joint.

* * * * *